(12) United States Patent
Gujarathi et al.

(10) Patent No.: US 11,734,408 B2
(45) Date of Patent: Aug. 22, 2023

(54) REMAPPING OF UNIFORM RESOURCE LOCATORS FOR ACCESSING NETWORK APPLICATIONS

(71) Applicant: Citrix Systems, Inc., Fort Lauderdale, FL (US)

(72) Inventors: Ashish Gujarathi, Parkland, FL (US); Santosh Sampath Gummunur Chiranjeevi, Bengaluru (IN); Krishna Kumar, Sunnyvale, CA (US); Deepak Sharma, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 42 days.

(21) Appl. No.: 17/376,512

(22) Filed: Jul. 15, 2021

(65) Prior Publication Data

US 2023/0014970 A1    Jan. 19, 2023

(51) Int. Cl.
*G06F 21/41* (2013.01)

(52) U.S. Cl.
CPC .................................. *G06F 21/41* (2013.01)

(58) Field of Classification Search
CPC ...... G06F 21/41; H04L 63/10; H04L 63/0815
See application file for complete search history.

(56) References Cited

U.S. PATENT DOCUMENTS

| | | | |
|---|---|---|---|
| 8,078,739 B1* | 12/2011 | Somasundaram | H04L 63/0209 709/227 |
| 9,294,572 B2* | 3/2016 | Thomas | H04L 63/083 |
| 10,367,890 B2* | 7/2019 | Thakkar | H04L 67/02 |
| 11,151,239 B2* | 10/2021 | Elias | G06F 21/41 |
| 11,201,866 B1* | 12/2021 | Specht | H04L 63/08 |
| 2006/0218629 A1* | 9/2006 | Pearson | G06F 16/954 726/8 |
| 2006/0218630 A1* | 9/2006 | Pearson | G06F 21/41 726/8 |
| 2011/0030043 A1* | 2/2011 | Jones | H04L 63/0815 726/7 |

(Continued)

FOREIGN PATENT DOCUMENTS

WO    WO-2020232336 A1 * 11/2020    ......... G06Q 20/3276

OTHER PUBLICATIONS

International Search Report and Written Opinion for PCT Application No. PCT/US2022/036964 dated Nov. 9, 2022 ( 12 pages).

*Primary Examiner* — Michael Simitoski

(57) ABSTRACT

Described embodiments provide systems, methods, non-transitory computer-readable medium for using a single sign-on (SSO) to access an application. A client application on a client device in communication with an identity provider and an application on a remote computing device. The client application can authenticate a user via an identity provider to establish an authentication session. The client application can identify a request to access a uniform resource locator (URL) of the application hosted on the remote computing device. The client application can determine that a configuration of the client application identifies a remapped URL for the URL is available. The client application can access the remapped URL instead of the URL to cause the user to use the authentication session of the identity provider and be redirected from the identity provider to a link of the application on the remote computing device.

20 Claims, 9 Drawing Sheets

(56) References Cited

U.S. PATENT DOCUMENTS

| | | | |
|---|---|---|---|
| 2012/0278872 A1* | 11/2012 | Woelfel | H04L 63/0815 726/7 |
| 2013/0111549 A1* | 5/2013 | Sowatskey | H04L 63/0823 726/3 |
| 2013/0198005 A1* | 8/2013 | Xiong | H04N 21/812 709/219 |
| 2016/0142399 A1* | 5/2016 | Pace | G06F 21/41 726/4 |
| 2017/0068649 A1* | 3/2017 | Staunovo Polacco | H04L 65/80 |
| 2018/0077143 A1* | 3/2018 | Sridharan | H04L 63/0807 |
| 2018/0295134 A1* | 10/2018 | Gupta | H04L 67/02 |
| 2020/0084284 A1* | 3/2020 | Chauhan | H04L 67/51 |
| 2020/0153818 A1* | 5/2020 | Chauhan | H04L 63/0853 |
| 2020/0233918 A1* | 7/2020 | Mummadi | H04L 63/0815 |
| 2022/0150237 A1* | 5/2022 | Canfield | H04L 63/104 |
| 2022/0217132 A1* | 7/2022 | Ahmed | H04L 63/0807 |

\* cited by examiner

REMAPPING OF UNIFORM RESOURCE LOCATORS FOR ACCESSING NETWORK APPLICATIONS

FIELD OF THE DISCLOSURE

The present application generally relates to access to computing resources, including but not limited to systems and methods of single sign-on authentication.

BACKGROUND

A client device can request access to a resource. The request to access the resource can be initiated via user interaction with a uniform resource locator ("URL") of the resource. The client device may be prompted to input client credential information for authentication purposes.

BRIEF SUMMARY

A client can launch workspace applications to access workspace services. Workspace applications can be accessible to the clients to provide secure access to services hosted on a network, such as web applications or software-as-a-service ("SaaS") applications. To launch such applications, the client may access numerous uniform resource locators ("URLs"). In accessing, a user of the client can interact with individual icons associated with the web applications or SaaS applications. For example, to access an application, a user can click on an icon of the respective application in a store provided in the workspace application (sometimes generally referred to as a workspace), URL within the workspace application, or URL within a document launched in the workspace application.

Among other locations, the URL may be present in micro application ("micro app") notifications or blades. A blade may be a template pushing a piece of code into workspace applications to display content, such as a URL in a portion of the workspace application. The URL may also be presented as content viewed or edited within an embedded browser of the workspace application. The URL may also be present in notifications through integrations with third-party service applications. Some of the third-party service applications can include video conference applications, messaging applications, among others. In some cases, the client can input one or more URLs in an embedded browser to access web or SaaS applications.

When the client launches an application (e.g., web application or SaaS application), the client can be redirected to an identity provider ("IDP") to validate the identity of the users. The client can transmit credentials entered by the users to the identity provider for validating user identities. For example, the client can proceed through an authentication flow. The authentication flow can include presenting a login page of the application to clients or presenting authentication techniques, or method of authentication for users to enter credentials or use company credentials to be redirected to the IDP. A user can complete an authentication process if the IDP session has expired within the workspace application or if the users have not been previously authenticated. The user can complete the authentication process by providing at least one of the username, password, or registered email address, among other identification.

A URL for accessing applications can show up in any number of contexts or content. For example, the URL can show up in browser contexts, such as web browser or embedded browser. The content can include at least one of an application, notification, or document that the URL can appear in. As such, it can be challenging for a client to access URLs that would bypass the authentication flow if previously authenticated in other contexts. For example, even when administrators may have already configured single sign-on ("SSO") configurations for applications within the IDP used by the workspace, clients may be repeatedly prompted to enter credentials when launching the applications in a different context or content. The repeated prompts for entering credentials each time a different application is accessed may be deleterious for human-computer interactions (HCI) between the user and the browser. Furthermore, the repeated carrying out of the authentication flow may needlessly consume additional computing resources, such as processing power, memory, and network bandwidth, especially when the user has already gone through the authentication process at least once. Additionally, repeated prompts or requests for a user to re-authenticate can decrease access time for the user without any enhancement to the security of the applications, since the user has already been authenticated.

To address these and other technical challenges to provide and facilitate authentication flow for accessing services, a workspace application executing on a client can check single sign-on (SSO) configurations for applications. The configurations can be provided or modified by an administrator of the workspace application. The configurations can indicate whether the URL transmitted by clients should be remapped to a URL of the IDP. The remapped URL can be a custom URL configured by the administrator. By remapping the URL, the IDP can determine whether to provide a login page to clients or access to the application. The workspace application can provide a URL processor function used to open any URL accessed within any context in the workspace application. The workspace application can access the URL via a web browser or embedded browser. The URL processor function can handle URLs to establish context. For example, the workspace application can intercept new window event handlers and identify URLs to be opened and methods for communication with servers, such as the servers providing services corresponding to the applications. The workspace application can identify an alternate URL, via rules available directly or by transmitting a request to administrator-provided configuration, such as within the IDPs managed by the administrator of the workspace application or third-party IDPs. Based on whether rules are available or configuration exists for remapping URLs requested by clients, the workspace application can facilitate SSO for web applications or SaaS applications.

The facilitation of the SSO may be facilitated using a webview of a workspace application. The workspace application can log into a workspace where authentication is handled by a webview. Webviews can be windows where clients display web pages, applications, or an authentication page to users for entering in credentials. During authentication, the IDP may have cookies and other device information inside a specific webview browsing context. Cookies can indicate if a client has at least one existing session authenticated and verified by the IDP. However, when links are opened on a client or embedded browser of the workspace application, cookies or other browsing contexts may not be available to the IDP. The workspace application can provide or allow the IDP with access to cookies or session information in an authentication webview (e.g., webview for authenticating clients). For example, cookies may be stored in association with the respective webviews when establishing a session with the IDP. The workspace application can allow the IDP with access to the cookies by at least one of copying/syncing the cookies from one webview to another or utilizing a particular webview for authenticating the user. Therefore, the IDP can access the cookies of at least one of the webviews to identify an existing session established between a client and the IDP.

Under one approach, the workspace can be associated with an IDP, such as a gateway service (e.g., a NetScaler Gateway Service ("NGS")), that is maintained by the same entity as the workspace service or application. The gateway service can authenticate clients to provide secure, remote access to applications within the workspace including, but not limited to, SaaS or on-premises web applications. The gateway service can be in the IDP chain for a SaaS application. In this case, the workspace can request the gateway service to establish SSO (e.g., via Security Assertion Markup Language ("SAML") or OAuth) to SaaS/Web applications. The SAML and OAuth may be used to access delegation to allow the IDP to pass authorization credentials to service providers and to provide clients with access to resources or various applications using one set of credentials. The gateway service can provide support for issuing a one-time-use URL that can be invoked to replicate an IDP session (e.g., cookies, etc.) of the gateway service within different webviews. To facilitate SSO, this support for issuing a one-time-use ULR can be re-used as part of the URL remapping.

Under another approach, the workspace can be associated with third-party IDP(s). In this case, the workspace application may have IDP cookies when authenticating clients to the workspace. As such, the workspace application can copy cookies (sometimes referred to as IDP cookies) into an embedded browser before opening a SaaS/Web app or URL link. Since the cookies are available to the IDP through the embedded browser used to launch the application, the application may not prompt the client to enter credentials if session cookies are valid indicating that the client has previously been authenticated. In this case, the cookies can be synced between embedded browser and workspace application webview.

To maintain the cookies, the workspace application can use a specific webview for IDP URLs (e.g., authentication webview ("auth-webview")) in further approach. For example, the workspace application can open SaaS or Web application URL in an embedded browser. The workspace application can inform the embedded browser of all the IDP domains. The URL can render in the embedded browser, and as part of authenticating the client, the client can be redirected to an IDP URL. The embedded browser can detect the redirection and render the IDP URL using the auth-webview. The auth-webview can provide or make available the full IDP context. The full IDP context can include at least cookies, local storage, an indexed database storing account data, or saved passwords accessible by the IDP via the auth-webview. The full IDP context may be available to any applications of the workspace or applications managed by the IDP associated with the workspace application (e.g., Files-sync agent, or Virtual Private Network ("VPN") client). In some cases, the full IDP context can be limited to certain applications, such as configured by the administrator of the workspace. Given this, the user of the client may not be prompted to re-enter credentials if previously authorized, within a predetermined time. The IDP URL therefore can be used to redirect to the original application URL, such as SaaS or web application or URL link selected by the user. The URL can again be rendered back in the embedded browser context. This process can be repeated or used for loading any authentication URLs in a workspace application webview.

In this manner, by facilitating SSO by leveraging existing sessions indicated by information associated with the embedded browser or webview, network traffic between client devices or the IDP itself may be reduced. For example, by reducing requests for credentials from IDP, the transmission of an additional webpage for the user to log in, and exchange of credential information from client devices, the consumption of computing resources such as processing power, memory, and network bandwidth can be reduced. Furthermore, by reducing the number of times that users have to enter authentication credentials and lowering the time to access each individual application, the HCI between the user and the workspace application may be improved.

One or more aspects of this disclosure are directed to systems, methods, devices, and/or non-transitory computer-readable mediums for remapping uniform resource locators (URLs) for accessing network applications. A client application can facilitate SSO. The client application can be on a client device in communication with an identity provider and an application on a remote computing device. The client application can authenticate a user via an identity provider to establish an authentication session. The client application can identify a request to access a uniform resource locator (URL) of the application hosted on the remote computing device. The client application can determine that a configuration of the client application identifies a remapped URL for the URL is available. The remapped URL can be configured to authenticate the user for the application via the authentication session of the identity provider and be redirected by the identity provider to a link of the application. The client application can access the remapped URL instead of the URL. The remapped URL can cause the user to use the authentication session of the identity provider and be redirected from the identity provider to the link of the application on the remote computing device.

In some implementations, the client application can maintain the authentication session with the identity provider. In some implementations, the client application can obtain a cookie from the identity provider and a one-time URL for accessing the application from the identity provider. In some implementations, the client application can intercept an event to cause a new window to access the application and identifying the URL to be accessed for the new window.

In some implementations, the authentication session can include a single sign-on (SSO) session. In some implementations, the remapped URL can be mapped to a single sign-on (SSO) configuration via the identity provider for the application. In some implementations, the remapped URL can be configured to establish another session with a second identity provider and open the link to the application.

These and other aspects and implementations are discussed in detail below. The foregoing information and the following detailed description include illustrative examples of various aspects and implementations and provide an overview or framework for understanding the nature and character of the claimed aspects and implementations.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
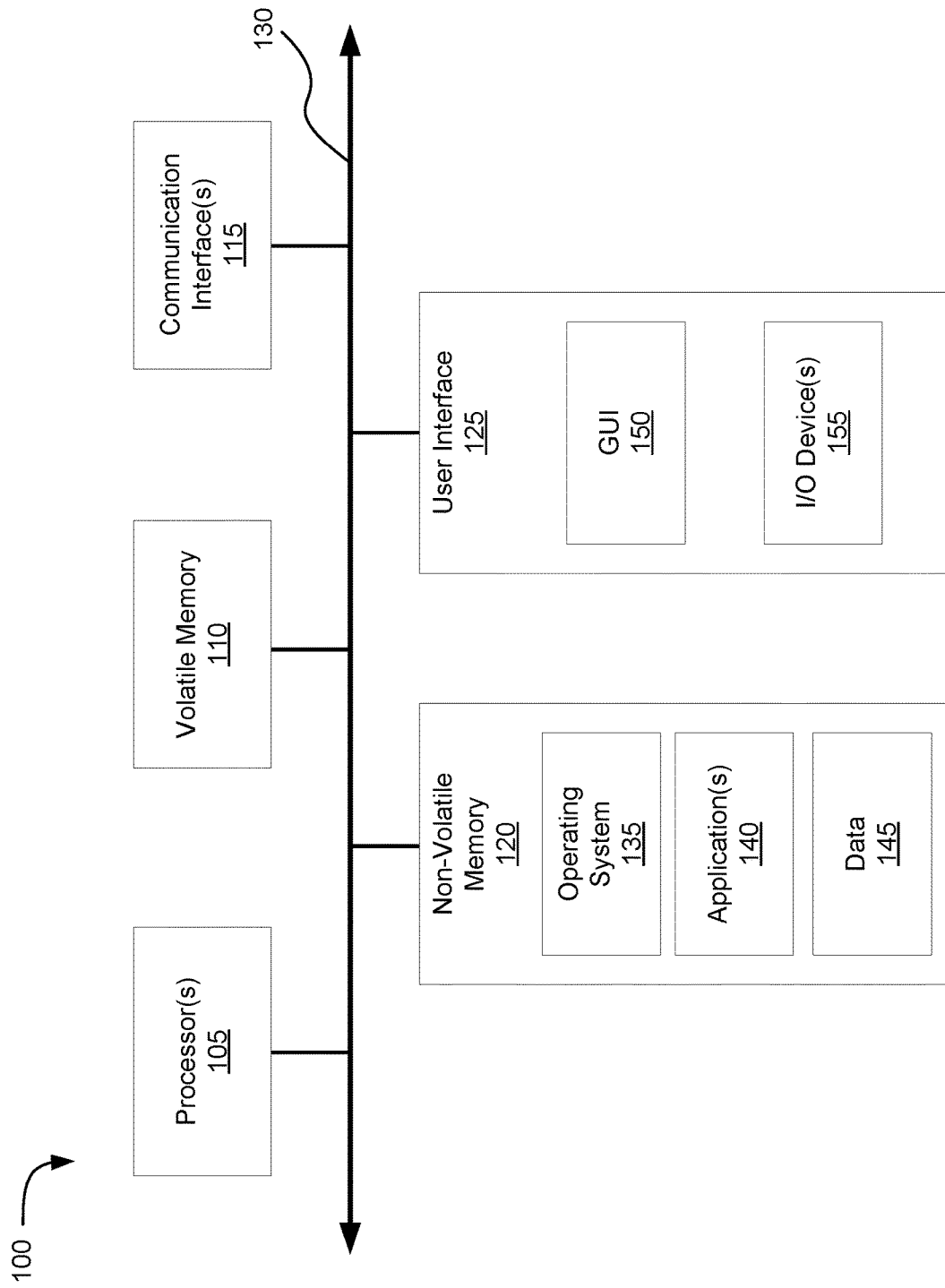
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods of remapping uniform resource locator (URL) for accessing network applications.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
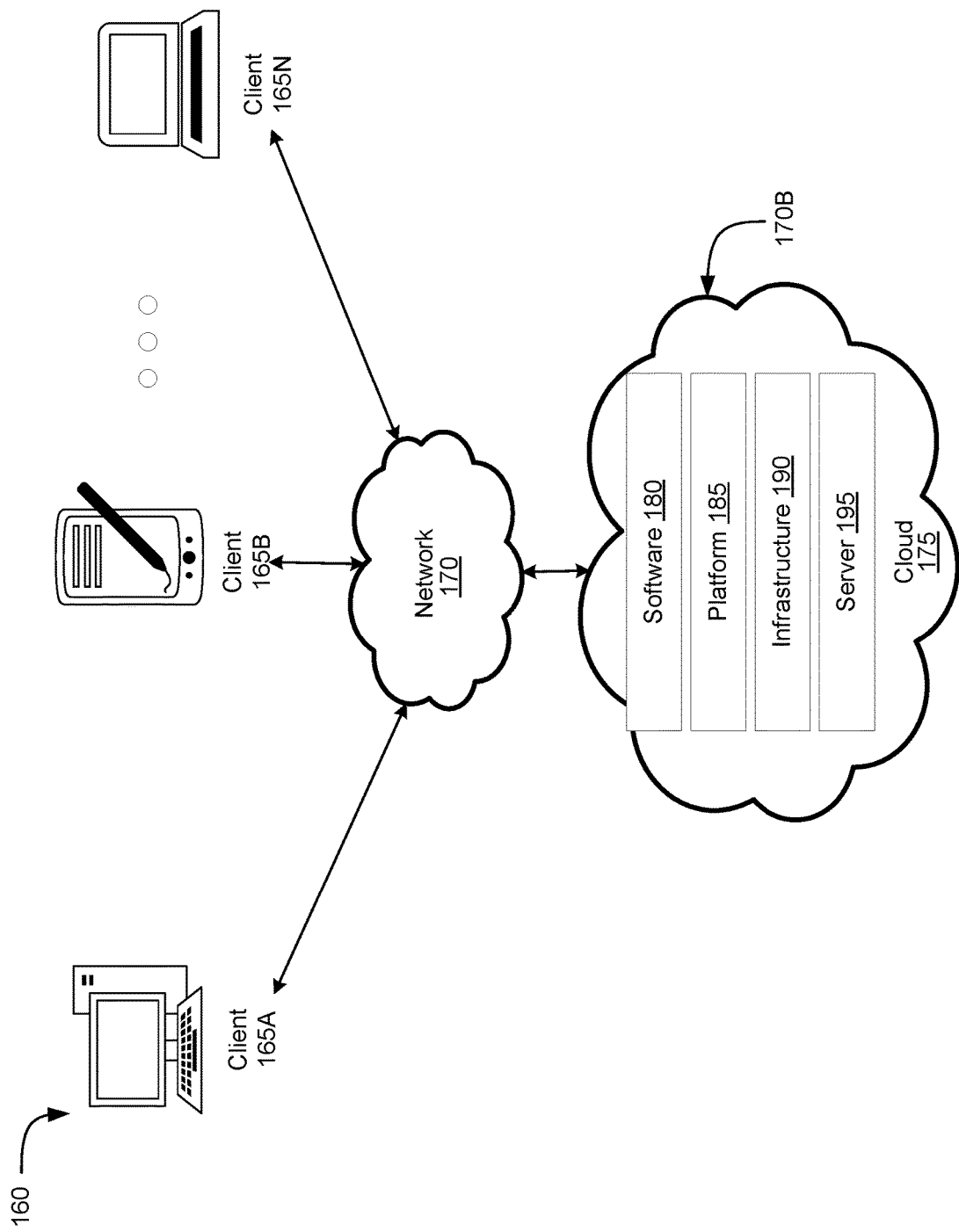
FIG. 1B is a block diagram depicting a computing environment comprising a client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Wash.; RACKSPACE CLOUD provided by Rackspace US, Inc., of San Antonio, Tex.; Google Compute Engine provided by Google Inc. of Mountain View, Calif.; or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash.; Google App Engine provided by Google Inc.; and HEROKU provided by Heroku, Inc., of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, Calif.; or OFFICE 365 provided by Microsoft Corporation. Examples of SaaS may also include data storage providers, e.g., DROPBOX provided by Dropbox, Inc., of San Francisco, Calif.; Microsoft SKYDRIVE provided by Microsoft Corporation; Google Drive provided by Google Inc.; or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
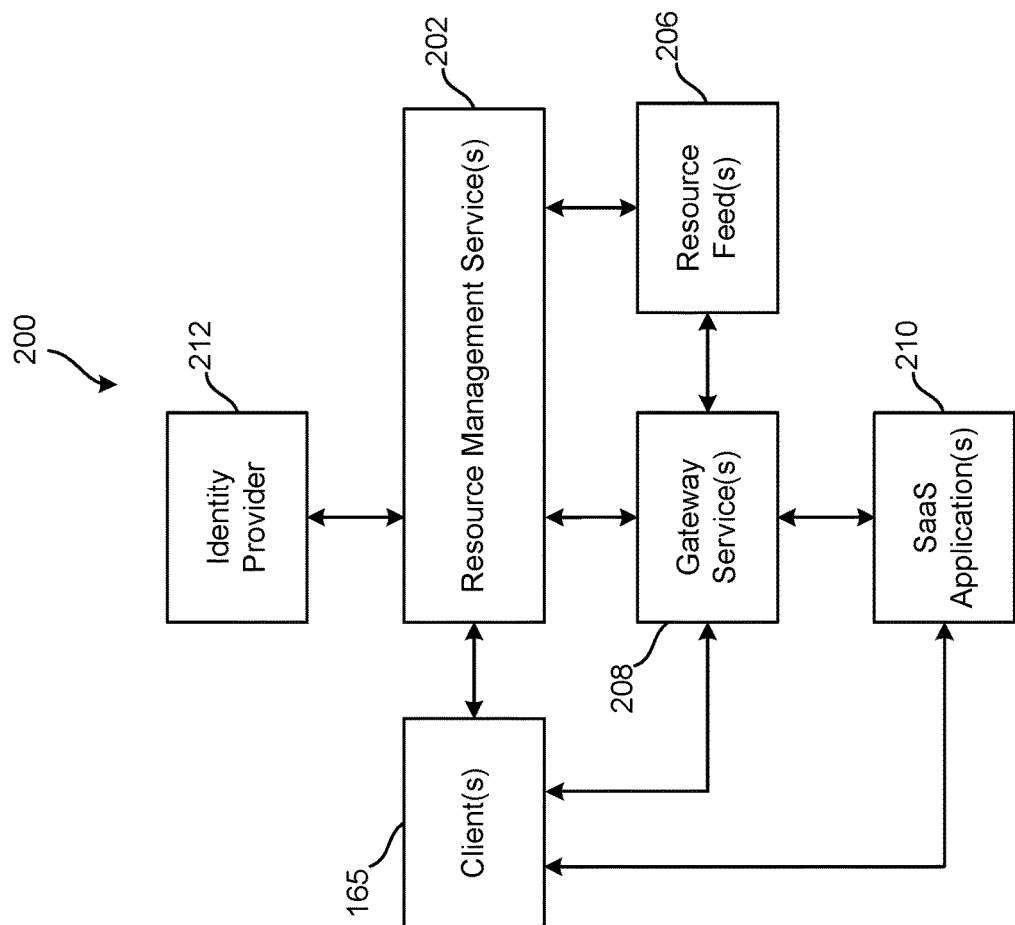
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
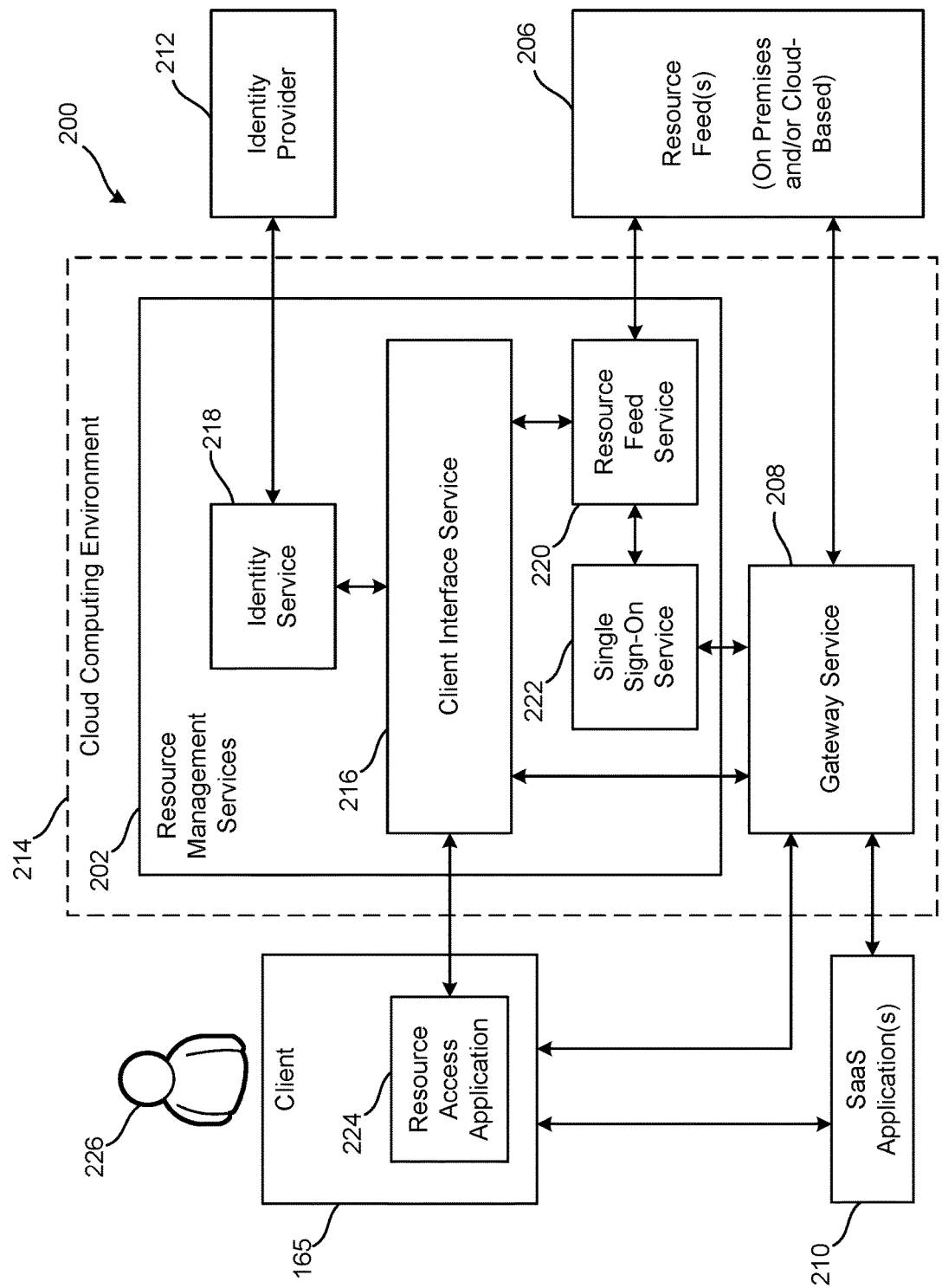
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of the illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well as a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (4) restricting navigation, e.g., by disabling the next and/or back browser buttons, (5) restricting downloads, e.g., by disabling the ability to download from within the SaaS application, and (6) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface— without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
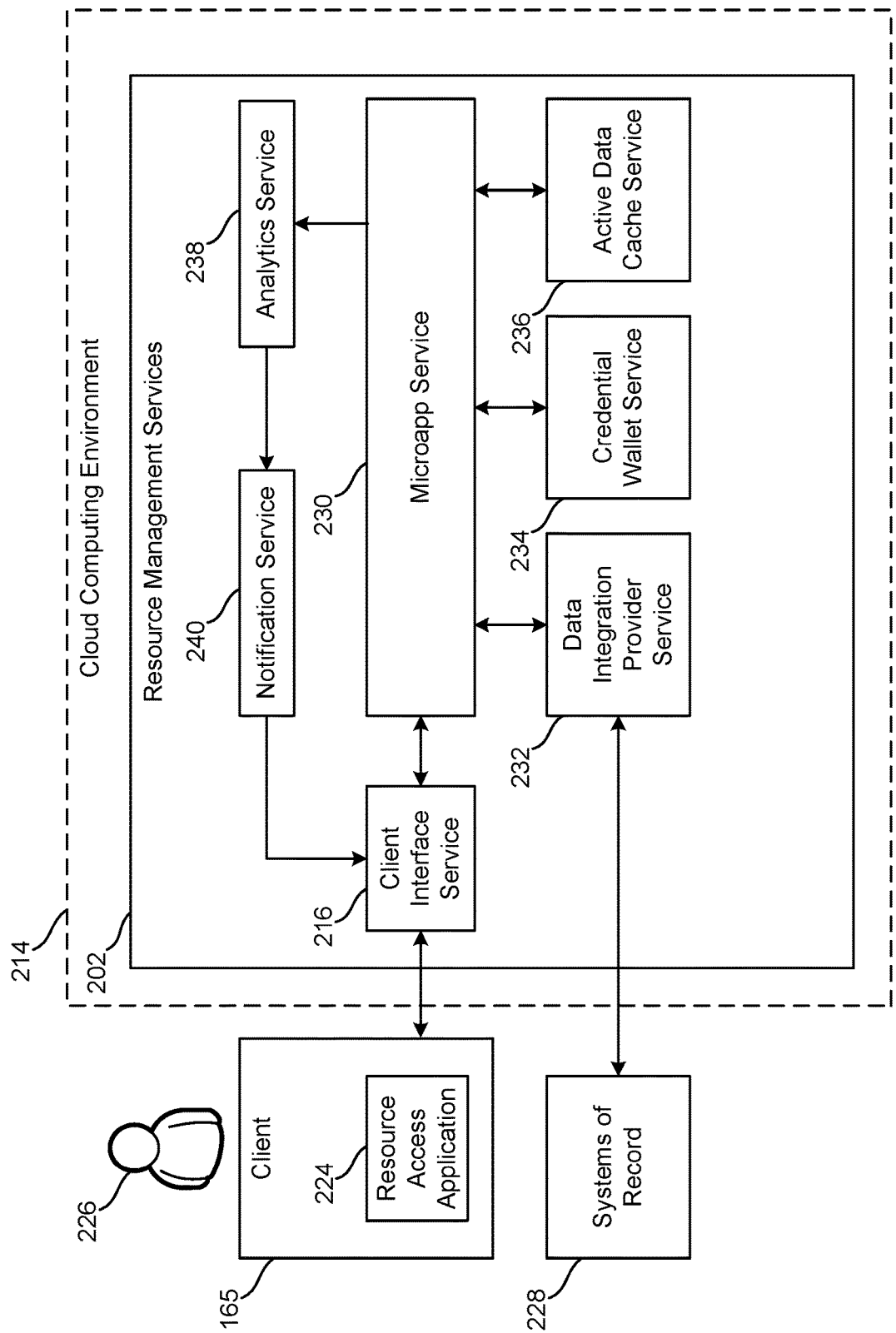
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6 ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back end. In some embodiments, users may be able to interact with the virtual assistance through either the resource access application 224 or directly from another resource, such as Microsoft Teams. This feature may allow employees to work efficiently, stay organized, and delivered only the specific information they are looking for.

Figure 3:
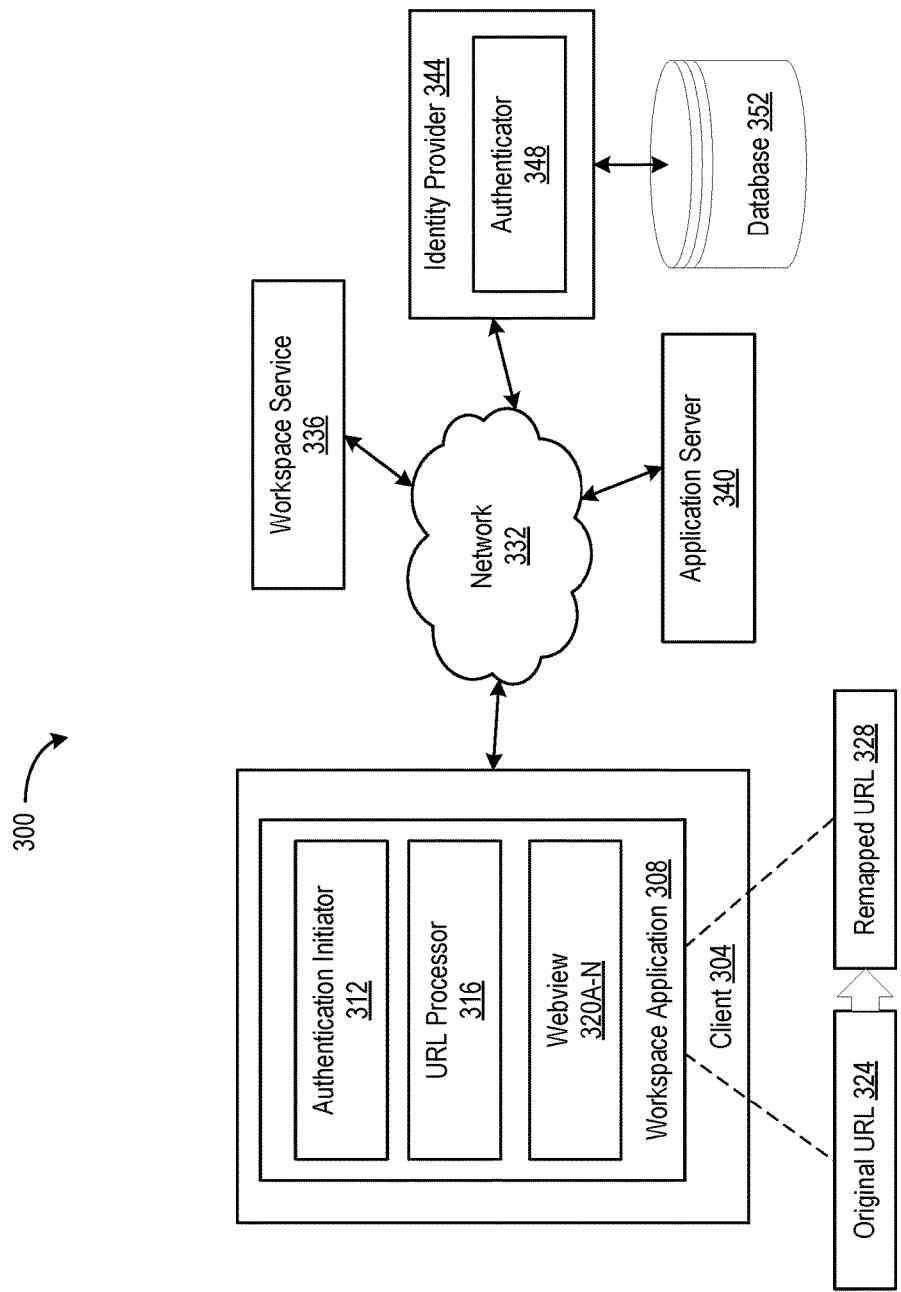
FIG. 3 is a block diagram of a system for remapping uniform resource locator (URL) to authenticate users for applications via sessions with identity providers, in accordance with an illustrative embodiment.

C. Systems and Methods for Remapping a Uniform Resource Locator (URL) for Accessing Network Applications Referring now to FIG. 3, depicted is a block diagram of a system 300 for remapping a uniform resource locator (URL) to authenticate users for applications via sessions with identity providers. In brief overview, the system 300 can include at least one client 304 (sometimes referred to as a client device or user device), at least one network 332, at least one workspace service 336, at least one application server 340, at least one identity provider 344 ("IDP"), at least one database 352 (sometimes referred to as a remote database or data repository) of the IDP 344, among others.

The client 304 can include or execute at least one workspace application 308. The workspace application 308 can include at least one authentication initiator 312, at least one URL processor 316 (sometimes referred to as a native logic or generally as processor 316), and one or more webviews 320A-N (sometimes generally referred to as webviews 320). In some cases, the authentication initiator 312 can include or be an authentication webview or at least one of the webviews 320, such as webview 320A. The IDP 344 can include an authenticator 348. The IDP 344 can be in communication with the database 352. One or more components, elements, or entities (e.g., client 304, workspace service 336, application server 340, or IDP 344) of the system 300 can communicate or transfer data with other components of the system 300 via the network 332.

Each of the above-mentioned elements or entities can be implemented in hardware, or a combination of hardware and software, in one or more embodiments. Each component of the system 300 may be implemented using hardware or a combination of hardware or software detailed above in connection with FIGS. 1A and 1B. For instance, each of these elements or entities can include any application, program, library, script, task, service, process or any type and form of executable instructions executing on hardware of the system 300, such as the client 304, the workspace service 336, the application server 340, the IDP 344, or the database 352. The hardware can include circuitry such as one or more processors and/or memory in one or more embodiments. Further, the one or more components of the system 300 can include or be performed in conjunction with the components (e.g., resource management services 202, resource feeds 206, gateway services 208, Software-as-a-Service ("SaaS") applications 210, IDP 212, cloud computing environment 214, systems of record 228, among others), features, or functionalities as discussed in FIGS. 2A-C. For example, the IDP 344 can include features or functionalities of the IDP 212, and the application server 340 can manage one or more applications, such as the SaaS applications 210.

The workspace application 308 executing on the client 304 can be an instance of the resource access application 224 detailed above, and may be used to access services hosted on the workspace service 336 and the application server 340. The workspace application 308 can include, be, or be a part of a workspace for launching one or more applications (e.g., web/SaaS applications) to access content, documents, or other resources available in the workspace from the workspace service 336. The workspace application 308 (sometimes herein referred to as a workspace platform) can provide clients 304 with a tailored view of secured applications or micro applications accessible by authorized clients 304 for enhancing productivity, engagement, and experience of users when accessing applications in the workspace. The user interface or tailored view of the workspace application 308 can be configurable by the administrator of the workspace or custom configured by the user. The workspace application 308 can enable or provide single sign-on ("SSO") authentication for clients 304. The SSO authentication can include features or functionalities of SSO service 222 in conjunction with FIG. 2B, in some cases. The workspace application 308 can be installed on the client 304 through an application store. To access the workspace application 308, the client 304 can transmit an access request to or log into the workspace service 336.

The workspace service 336 can include, store, or manage resources accessible through the workspace application 308. The workspace service 336 can be implemented using hardware or a combination of software and hardware. The workspace service 336 can provide access to one or more resources to authorized or verified clients 304. For example, users can log into a workspace application 308 to access features, functionalities, or services provided by the workspace service 336, such as documents or applications. Based on the account type or level of access granted to the user account, the client 304 can gain access or be restricted from various features stored or managed by the workspace service 336. The workspace service 336 can include or be linked to a data repository to store resources for the workspace or information of the user accounts. The resources or information can include, for example, client information, credential information, among others.

The application server 340 can include, store, or manage resources for one or more applications accessible for validated or authorized users. The application server 340 can be implemented using hardware or a combination of software and hardware. The application server 340 can provide access to one or more applications (e.g., resources, features, or functionalities of one or more applications) to authorized or verified clients 304. For example, the user can open an application presented on the workspace. Based on the account type or level of access granted to the user account, the client 304 can gain access or be restricted from various features stored or managed by the application server 340 for the respective application. In some cases, the client 304 may be restricted from accessing or opening the application altogether. The application server 340 can include or be linked to a data repository to store resources for one or more applications or information of the user accounts (e.g., client information, credential information, among others). The application server 340 and the workspace service 336 can be in communication with at least one IDP 344 to manage or determine the authorization of the user to access the respective features or functionalities of the application server 340 or the workspace service 336.

To authorize the user to access features of the workspace service 336 or the application server 340, the IDP 344 can be called, used, or relied upon to verify the user. The IDP 344 can be trusted or establish trusts with one or more components of the system 300, such as the workspace service 336 or the application server 340. By establishing trust, components of the system 300 can redirect the client 304 to access the IDP 344 trusted by the components. Individual components of the system 300 can establish trust with multiple IDPs, which the client 304 or the workspace application 308 executing on the client 304 can be redirected to. The IDP 344 can be managed by an entity or an administrator of the workspace service 336 managing the workspace platform (e.g., workspace application 308) executing on the client 304. In some implementations, the IDP 344 can include or be a part of the gateway service 208, such as in conjunction with FIGS. 2A-B. In some other implementations, the IDP 344 can be managed by a third-party entity, such as an entity different from those managing the workspace platform.

In some embodiments, the authentication initiator 312 can include or in some cases be an authentication webview. A webview can be an embeddable browser that applications (e.g., web/SaaS applications or micro applications) can use to display content. For example, the authentication initiator 312 can initiate the authentication session with the IDP 344. The IDP 344 can request authentication credentials from the user of the client 304 via the authentication session. The authentication webview can be used to provide users with a page for entering credentials and other webviews (e.g., webviews 320) can be used to provide users with other contents, such as general viewing webpages or documents without authentication, for display on the client 304. Once the user provided the credentials, the authentication initiator 312 can transmit the credentials to the IDP 344 for verification. Upon approval or authorization, the client 304 can be granted access via the workspace application 308 to access the requested resources, data, contents, applications, among other approved features. The approved features accessible to the client 304 can be based on the user account logged in by the user. The user account can be the workspace account logged in using the user credentials.

To access features or functionalities of the workspace application 308, the authentication initiator 312 can authenticate a user of the client 304 via the IDP 344 to establish an authentication session. The authentication session may correspond to a first instance of the user authenticating with the IDP 344. In some embodiments, the authentication session may be a single sign-on (SSO) session between the IDP 344 and the workspace application 308 of the client 304. In establishing the session, the authentication initiator 312 can initiate or transmit a request to access resources hosted on the workspace service 336 or the application server 340. The resources may include components or elements within the workspace (e.g., applications, files, or other resources). To access the workspace, the request can be transmitted to the workspace service 336. To access a particular feature or application within the workspace, the request may be transmitted to the application server 340. In either case, the request originating from the authentication initiator 312 may be redirected to the IDP 344. In some embodiments, the authentication initiator 312 can receive an address (e.g., a URL) to communicate with the IDP 344 for authenticating the client 304. The authentication initiator 312 can receive the address to communicate or be redirected to the IDP 344 from either the workspace service 336 or the application server 340 when requesting a resource, given that the user has yet to be authorized or has not timed out, for example. The workspace service 336 can receive a request to access resources stored in a data repository of the workspace service 336, such as for accessing features or functionalities available in the workspace application 308. The workspace service 336 can transmit instructions to the client 304 in response to receiving an access request. For example, responsive to receiving a request to access or launch the workspace, the workspace service 336 can transmit instructions for redirecting the workspace to the IDP 344 trusted by the workspace service 336. The instructions can include a URL of the IDP 344 (e.g., IDP URL) to connect the workspace application 308 to the IDP 344. Once connected, the workspace application 308 can receive a request for credentials, which the user can provide for authentication.

In authenticating the user, the authentication initiator 312 of the workspace application 308 can be redirected to the IDP 344 to establish the authentication session using the URL provided by the workspace service 336 (or the application server 340). Upon receipt, the authentication initiator 312 can invoke the URL processor 316 to handle the URL. The URL processor 316 can process the URL included in the redirection. For example, the URL processor 316 can process the IDP URL provided by the workspace service 336. The URL processor 316 can launch the URL instructed by the workspace service 336. Once launched, the URL processor 316 can access the IDP 344. When invoking the URL, the URL processor 316 can connect at least one webview or component of the workspace application 308 with the IDP 344.

The IDP 344 can receive the access request redirected from the workspace service 336 or the application server 340. The IDP 344 can receive the access request in response to the URL processor 316 accessing, invoking, or processing the IDP URL to communicate with the IDP 344. The IDP 344 can determine whether there is an existing session stored in the cookies of the respective component of the workspace in communication with the IDP 344, such as the authentication initiator 312 or an authentication webview. Existing session information can be stored on a respective component of the workspace previously authenticated by the IDP 344 (or other IDPs). For example, there may be an existing established session if the user has previously authenticated and has not timed out or logged off. In this example, if there is an established session, the IDP 344 may refrain from prompting the client 304 with an authentication page, notification, or transmit an instruction to the workspace application 308 to launch an authentication webview. Details regarding when there is an existing session are discussed herein below.

In contrast, if the IDP 344 has not previously authenticated the user, the IDP 344 can transmit instructions to the workspace application 308 to prompt the user of the client 304 to enter authentication credentials. The transmitted instructions may be to initiate an authentication webview for display on the client 304 or launch an authentication page or a notification requesting credentials from the user. The authenticator 348 executing on the IDP 344 can determine whether to verify credentials from clients 304. The IDP 344 can include, be linked to, or exchange data with a database 352. The database 352 can include or be referred to as a data repository, a remote database, a remote storage device, or an IDP storage device.

The authenticator 348 can maintain credentials (e.g., user credentials) for authenticating users the client 304 in the database 352. The database 352 can include or store any information from the IDP 344 and include resources or data for the authenticator 348 to verify user credentials. The authenticator 348 can compare credentials from the client 304 to a list of valid credentials or authorized accounts stored in the database 352. In some implementations, the IDP 344 may not include or store information from cookies of one or more webviews 320 of the workspace application 308, such as the browsing contexts of webviews 320. The IDP 344 can identify the browsing context for individual webviews while in communication or establishing a communication path with the respective webviews (e.g., authentication initiator 312 or webview 320).

In some implementations, the database 352 can include, store, or maintain information from other components of the system 300, such as the client 304, the workspace service 336, or the application server 340. For example, the database 352 can store a list of trusted services or servers and applications with a session established with the IDP 344. The database 352 can include subsets of storage devices or different compartments of storage space, which can be dynamically adjusted based on available space, configured to store different types of data from one or more components of the system 300. The database 352 can store other data for use by the IDP 344 as discussed herein.

The user (e.g., operator of the client 304) can provide either user credentials or company credentials to the authentication initiator 312 subsequent to receiving a request for credentials from the IDP 344. The authentication initiator 312 can transmit credentials to the IDP 344 for authenticating the user identity. The authentication initiator 312 may transmit other information to the IDP 344, such as device information of the client 304, IP address from which the credentials are transmitted, among other information allowed by the client 304 to be sent.

The IDP 344 can determine whether the credentials are valid. For example, the authenticator 348 of the IDP 344 can compare the credentials received from the authentication initiator 312 to a list of valid credentials stored in the database 352. Based on the credentials, one or more features or functionalities of the workspace application 308 may be accessed or, in some cases, restricted according to the authorization level granted to the user account. If valid, the IDP 344 can provide or establish an authentication session with the client 304. For example, the workspace application 308 can authenticate the user of the client 304 via the IDP 344 to establish the authentication session. The authentication session can include an SSO session to avoid having users enter additional credentials for applications accessed in the workspace since the user was already authorized when accessing the workspace application 308. For example, having the SSO session, the client 304 can access one or more applications within the workspace application 308 without having to re-enter credentials the user identity.

Upon completing the establishment of the authentication session, the workspace application 308 can maintain the authentication session with the IDP 344. The workspace application 308 can maintain the authentication session by storing session information in cookies of the authentication initiator 312 or a webview used to transmit the credentials. For instance, the workspace application 308 can transmit the credentials via an authentication webview or a secure webview. In some implementations, establishing the authentication session can refer to establishing SSO to applications of the workspace application 308. For example, the establishment of the authentication session between the authentication initiator 312 and the IDP 344 can represent the user having been verified to access the workspace service 336, thereby also having access to one or more applications (or resources of the individual applications) available on the workspace based on the authority of the user account. Hence, when accessing one or more applications within the workspace, the information of the existing authentication session can be accessed by the IDP 344 to verify the user, facilitating SSO as discussed herein.

The authentication initiator 312 can include information from an existing authentication session, such as stored as cookies or other browsing contexts (sometimes referred to or include IDP context). The authentication initiator 312 can share context with the IDP 344, such as the browsing context included in cookies. The browsing context can include information on the system browser or embedded browser used to access an application, or client information associated with a session established between the client 304 (or workspace application 308) and at least one other component of the system 300, such as the workspace service 336, the application server 340, or the IDP 344. For example, the authentication initiator 312 can include cookies having browsing context used to access the IDP URL or establish a communication channel to the IDP 344. In another example, the authentication initiator 312 can include cookies having credentials entered by the user or session information (e.g., authentication session) when the credentials are validated and authorized. The session information can be maintained for a predetermined time period or until the user is logged out from the session or when the user terminates the session, for example. The predetermined time period can be configured by the administrator of the workspace. With cookies, the workspace application 308 can maintain the authentication session with the IDP 344, among other sessions with other components of the system 300.

In some implementations, the authentication initiator 312 can be an authentication webview (sometimes referred to as a secure webview) for authenticating to any IDP, such as an IDP managed by the entity of the workspace or third-party IDP. For example, the authentication webview can receive or get access to credentials entered by the user. The authentication webview can store the credentials as part of cookies specific to the authentication webview. Other webviews (e.g., webviews 320) can include their respective cookies. The authentication webview can establish a session with the IDP 344. In some cases, the session can be maintained by storing session information in the cookies of the authentication webview. To establish SSO to applications, the authentication webview can share or sync cookies with other webviews or be used to access a remapped URL or IDP URL of IDP 344 or any other IDPs trusted by the application server 340 to launch the application, for example.

The workspace service 336 can include or store a user interface of the workspace. After establishing the authentication session, the workspace service 336 can provide the user interface to the client 304 for display in the workspace application 308. The user interface can include features available for access by the user based on access level granted to the client 304. The features available for access can be based on the access level granted to the client 304 according to the user account. For example, the user interface can include icons (sometimes referred to as thumbnails, widgets, or legends) or URLs of web applications or SaaS applications. These icons or URLs can be associated with individual applications which can be accessed in a different browsing context, such as in a system browser or embedded browser.

Within workspace application 308, the client 304 can be presented with the user interface including at least icons associated with the respective applications, links (e.g., URL or hyperlinks), among others. The workspace application 308 can initiate or launch, via the workspace application 308, one or more applications in response to the user interacting with icons associated with the applications or links within a document. The workspace application 308 can launch the application in either an embedded browser or a system browser within the workspace application 308 based on an SSO context established by the workspace application 308. The workspace application 308 can communicate with the workspace service 336, the application server 340, or the IDP 344 to establish SSO context or facilitate SSO authentication for accessing applications within the workspace. For example, the user can interact with an icon or a URL or manually enter a URL into a browser. The URL processor 316 can process or otherwise handle the URL selected or entered by the user. The URL processor 316 can direct the client 304 to the application server 340 to access the resources associated with the selected application. The URL processor 316, along with other components, such as the authentication initiator 312 or at least one of the webview 320 of the workspace application 308, can facilitate SSO, thereby avoid having the user re-enter credentials or displaying a login page. For example, to launch or access the applications, the workspace application 308 can perform features and functionalities described herein to provide SSO authentication to the user.

The URL processor 316 can receive, intercept, or otherwise identify a request to access a uniform resource locator (URL) 324 of a resource hosted on the application server 340 (e.g., sometimes include or referred to as a remote computing device or a remote server). The detection of the request may be subsequent to the establishment of the authentication session. The request can be initiated by the user clicking on the URL, icon, or typing in the URL in a browser. The request can be a window event or a window event handler. The URL requested by the user can be an original URL 324 and can correspond to the application server 340 accessible within the workspace. The request to access the URL can be a window event initiated when the user interacts with an interactive element (e.g., an icon or URL). In some embodiments, the URL processor 316 can use an event listener or handler to obtain or intercept the request or the window event (sometimes referred to generally as an event) attempting to access the original URL 324. For example, the URL processor 316 can intercept an event to cause a new window to access the application. The event can include the original URL 324 used to access the application in the new window. The URL processor 316 can identify the URL 324 to be accessed for the new window. In some implementations, the URL processor 316 can identify at least one method of the URL 324 in the event. The method (e.g., HTTP method) can refer to an HTTP verb utilized to perform a function to the application associated with the original URL 324 identified in the event. For example, the method can include POST (e.g., create new resource), GET (e.g., read a representation of a resource), PUT (e.g., update resources of the URL), among others.

The workspace application 308 may maintain at least one configuration to define, specify, or otherwise identify at least one remapped URL 328 for the URL 324 to access the application server 340. The configuration may specify or define one or more URLs to be remapped. For example, the administrator can configured individual URLs to be remapped to a respective second URL (e.g., remapped URL 328) for redirecting to the IDP 344. In some implementations, the workspace application 308 may store the configurations locally on the client 304. In this case, the workspace application 308 can receive an update from the workspace service 336 to update the locally stored configurations. In some other implementations, the configuration for remapping the URLs can be stored in the data repository of the workspace service 336, such that the configurations can be up-to-date when the client 304 gains access to one or more resources of the workspace service 336 via the workspace application 308.

The remapped URL 328 can be used to authenticate the user for the application via the authentication session of the IDP 344 that was previously established. The remapped URL 328 can indicate for the IDP 344 to redirect the URL processor 316 to a link of the application server 340. The link of the application can include or be the original URL 324 or a second URL to establish a connection between the workspace application 308 and the application server 340 where the workspace can retrieve resources of the application. In some implementations, the workspace application 308 can transmit a request to the administrator-provided configuration for remapping configurations. For example, the workspace application 308 can transmit a request to the workspace service 336 for remapping configurations. The URL processor 316 can retrieve the configurations from the workspace service 336 to determine whether the intercepted event should result in a remapped URL 328 being invoked or without invoking the remapped URL 328.

In some implementations, the remapped URL 328 can be mapped or linked to an SSO configuration via the IDP 344 for the application. The SSO configuration can refer to settings establishing SSO for the application configured by the administrator of the workspace or the application. For example, the URL processor 316 can invoke the remapped URL 328 to connect to the IDP 344 via a session, such as an authentication session previously established or a second session different from the authentication session. By invoking the remapped URL 328 mapped to the SSO configuration, the URL processor 316 can retrieve or identity information within the SSO configuration, such as instructions to facilitate or provide SSO capabilities for the application identify steps the components (e.g., authentication initiator 312 or one or more webviews 320) should perform.

In another example, the administrator of the workspace can establish, based on the SSO configuration, an SSO for a first application and not for a second application. When users request access to the first application, if cookies indicating the browsing context and/or device information is available or accessible to the IDP 344, the workspace application 308 can access the first application without presenting a login page to the client 304. Without establishing SSO, if a user requests access to the second application, the IDP 344 may transmit a request for credentials to the client 304, thereby having the user re-enter credentials for re-verifying user identity.

The configurations (e.g., SSO configuration) for the workspace application 308 can be configured by the administrator of the workspace. For example, the administrator can create or configure a configuration file including SSO configurations. The administrator can associate individual SSO configurations to URLs where for the respective original URL 324, the URL processor 316 can identify a remapped URL 328 to be invoked. Invoking the remapped URL 328 can refer to the URL processor 316 returning the remapped URL 328 based on a configuration of the administrator for the authentication initiator 312 or one of the webviews 320 to access the remapped URL 328 instead of the original URL 324.

In some implementations, the administrator can provide configurations for URLs where the IDP 344 will be establishing an IDP session with the workspace application 308 in a different context (e.g., different browsing context). For example, with the configuration of the administrator, the IDP 344 can provide workspace application 308 with a URL that will first establish an IDP session in a context different from the context in which the authentication initiator 312 establishes the authentication session. The IDP 344 can transmit a deep link of the application for the URL processor 316 to invoke after establishing a session with the workspace application 308. Hence, the administrator can provide configurations for facilitating SSO by enabling the IDP 344 to obtain browsing context from the workspace application 308 to establish a new session (or via a previous authentication session) to provide a link for the workspace to access the application selected by the user. The remapped URL 328 can be configured to authenticate the user for the application via an existing authentication session of the IDP 344 and be redirected by the IDP 344 to a link of the application. The existing authentication session can refer to the session established between the workspace application 308 and the workspace service 336 when logging into the workspace. For example, the URL processor 316 can intercept an original URL 324. A URL can include at least a protocol or scheme, a hostname, a path, and a query string. For example, the host name can include subdomain, second-level domain ("SLD") or domain name, and top-level domain ("TLD") extension. The query string can include a query, a parameter, and a fragment, among others.

In some implementations, the remapped URL 328 can be a one-time-use URL supported by the IDP 344. The URL processor 316 can invoke the one-time URL to access the one-time URL for connection with the IDP 344. By invoking the one-time URL, the URL processor 316 can replicate previously established session information (established with the IDP 344) or cookies within different webviews 320 of the workspace application 308. In this case, different webviews 320 of the workspace application 308 can include replicated session information of other webviews 320, such as an authentication webview. Therefore, when the authentication initiator 312 or other webviews 320 connects to the IDP 344, the IDP 344 can obtain browsing context to authorize the user as part of the SSO. The IDP 344 may not transmit an instruction to launch an authentication webview or login page for the user to re-enter credentials.

Responsive to detecting the event, the URL processor 316 can determine whether a configuration is available for the URL. The configuration can be configured by the administrator of the workspace. In some embodiments, the URL processor 316 can find an SSO configuration (sometimes generally referred to as a configuration) associated with an original URL 324 indicating or identifying a remapped URL 328 to invoke for establishing SSO for the original URL 324. To determine whether any configuration is available, the URL processor 316 can perform a look-up in the configuration to determine if a remapped URL 328 is available for the original URL 324. If there is no configuration available, the URL processor 316 may proceed to access the original URL 324 requested by the user. In this case, the workspace application 308 may be redirected to the IDP 344 for access verification, where the IDP context may not be available. Hence, in this example, the IDP 344 may request credentials from the user. The IDP context can include or be the browsing context or cookies with information on the existing authentication session.

In another example, for determining whether a configuration is available for an original URL 324, the URL processor 316 can compare or identify at least the hostname and the path of the original URL 324 to configurations configured by the administrator. If a configuration exists or is available for the URL, the URL processor 316 can invoke an associated remapped URL 328 to connect with the IDP 344. In some cases, if no configuration is available for the original URL 324, the URL processor 316 can directly connect to the application server 340. In this case, the application server 340 may redirect the client 304 to the IDP 344 for verification, which may require the user to re-enter credentials in addition to the credentials provided to access the workspace.

By accessing the remapped URL 328, the workspace application 308 can cause the user to use the authentication session of the IDP 344 and be redirected from the IDP 344 to the link of the application on the application server 340, for example. Hence, the workspace application 308 can first perform SSO with the IDP 344 and be redirected to a deep-link within the application. For instance, the workspace application 308 can be redirected to access the application without prompted for additional credentials. In some implementations, some original URLs 324 may not be configured with an associated SSO configuration. The administrator can configure the SSO configuration associated with individual applications (e.g., web applications or SaaS applications). As part of the configuration, the administrator can provide configurations for URL remapping. For example, the configurations can indicate, for a certain original URL 324 that the URL processor 316 intercepted or found a configuration for, that the URL processor 316 can invoke a remapped URL 328 associated with the original URL 324. The remapped URL 328 can be an IDP URL or other URL for connecting to the IDP 344 via the authentication session, for example. The administrator can map individual remapped URLs 328 to their respective SSO configuration of applications.

In some implementations, the URL processor 316 can determine that a configuration of the workspace (e.g., client application) does not identify a remapped URL 328 for the URL (or icon) interacted by the user. For example, the URL processor 316 can compare the domain name of the original URL 324 to the configuration of the administrator. The URL processor 316 can determine that there is no match for the original URL 324. In this case, the webview 320 can be used by the URL processor 316 to access the application server 340 via the original URL 324. The application server 340 can perform an authentication process by redirecting the webview 320 to the IDP 344. Since the webview 320 was not used to establish the authentication session, the IDP 344 can instruct the URL processor 316 to launch a login page in the webview 320. Accordingly, the user can provide credentials for logging in to access the application. Upon successful authentication, the application server 340 can provide resources of the application associated with the URL to the workspace application 308. The resources of the application can include at least a webpage, a user interface of the application, a document or file, among other resources launched in either an embedded browser or a system browser. In other words, the webview 320 can launch the application in the embedded browser, the system browser, among other browsing contexts.

On the other hand, if there is a configuration available, the URL processor 316 can extract, obtain, or otherwise identify the remapped URL 328 identified in the configuration. Once the remapped URL 328 is identified for the respective original URL 324 requested by the user, the authentication initiator 312 can access the remapped URL 328. In some cases, one of the webviews 320 can access the remapped URL 328. The URL processor 316 can process the remapped URL 328 for access by the authentication initiator 312 or one of the webviews 320. The authentication initiator 312 can access the remapped URL 328 to communicate with the IDP 344. The authentication initiator 312 can provide the IDP 344 with access to cookies or browsing context indicating an existing session established between the workspace application 308 (or at least a component of the workspace application 308) and the IDP 344 (or other IDPs). For example, the authentication initiator 312 can provide the IDP 344 with access to browsing context when accessing the remapped URL 328 or when communicating with the IDP 344 to gain access to an application. The IDP 344 can verify the user based on determining that the user has an existing session with the IDP 344, and therefore the user has already provided validated credentials.

In some implementations, the URL processor 316 can use a specific webview for accessing the IDP URL or remapped URL 328 for authenticating the user. For example, the URL processor 316 can open, invoke, or process the original URL 324 of the application in an embedded browser. The URL can be used to access resources of the application from the application server 340. The URL processor 316 can inform the embedded browser of all the IDP domains or URLs available based on the configuration. The configuration can include a listing of IDP URLs configured to redirect the workspace application 308 based on the associated original URL 324. The processor 316 can render the URL in the embedded browser. The URL processor 316 can be redirected to an IDP URL by the application server 340 obtained from or based on the configuration. The URL processor 316 can detect the IDP URL and responsively render the IDP URL using a specific webview, such as an authentication webview (or authentication initiator 312). The authentication webview can be the webview used to authenticate the user when accessing the workspace service 336. The authentication webview can provide the full IDP context (sometimes referred to as browsing context or authentication context) to the IDP 344. The IDP context can include cookies of the webview, local storage of the client 304, indexed database (e.g., storing information related to established sessions), saved passwords or credentials, among others. The authentication webview can provide or make the IDP context available to any workspace application 308 or other applications managed by the entity of the workspace.

With the remapped URL 328 based on the configuration, the authentication webview can connect with the IDP 344. The connection may be via the previously established authentication session. The remapped URL 328 can indicate to the IDP 344 that the user is already authenticated via the authentication webview. Therefore, the IDP 344 can grant access to the user without having the user re-enter credentials. With the IDP URL, the URL processor 316 can redirect a webview 320 to access the original URL 324. For example, after authenticating the user using the IDP URL or remapped URL 328, the URL processor 316 can render the original URL 324 back in an embedded browser context. Accordingly, a webview 320 can launch or access the application via connection to the application server 340 for retrieving application resources. In these implementations, the workspace can perform features and functionalities described above for loading or processing any authentication URL (e.g., IDP URL or remapped URL 328) in any webviews 320 of the workspace application 308.

The workspace application 308 can access the IDP 344 via the remapped URL. The workspace application 308 can access the remapped URL 328 instead of the URL (or original URL 324) selected by the user. By accessing the remapped URL 328, the authentication initiator 312 or one of the webviews 320 of the workspace application 308 can use the authentication session of the IDP 344. The workspace application 308 can be redirected from the IDP 344 to the link to the application on the application server 340 when authenticated. Redirected, the workspace application 308 may use the authentication session previously established between the workspace application 308 and the IDP 344 or a second IDP. By using the established authentication session, the IDP 344 can gain access to the browsing context of the workspace application 308. Based on the browsing context indicating that the user is verified by the IDP 344 to access the workspace (or other applications), the IDP 344 can grant access to the user for accessing the requested application.

In some implementations, in accessing the remapped URL 328, the URL processor 316 can copy the cookies in response to or after the IDP 344 verified and granted workspace application 308 access to the resources of the workspace service 336. The workspace application 308 can obtain or store cookies when authenticated to the workspace. The URL processor 316 can copy all the cookies into embedded browsers or webviews 320 before opening or launching an application or URL link. The workspace application 308 can copy or sync the cookies for the webviews 320, such that any webviews 320 can communicate with the IDP 344 to provide access to the cookies. The workspace application 308 may use other webviews 320 besides an authentication initiator 312 to provide the cookie or browsing context to the IDP 344. In this case, the application may attempt to redirect the workspace application 308 to the IDP 344 for authentication. Since the cookies are available for the IDP 344, the IDP 344 can grant access for a webview 320 to access the application server 340 to retrieve resources of the application. The user does not need to re-enter credentials, since the cookies are available.

Based on the configuration of the administrator, the IDP 344 can retrieve cookies or session information available from the webview 320 in communication with the IDP 344. In some cases, the webview 320 can be a dedicated webview for authenticating the user. Among other information, the IDP 344 can retrieve browsing contexts, such as credentials previously entered by the user or sessions previously established with the client 304. If the IDP 344 is accessed using the remapped URL 328, the IDP 344 can determine that the user was already verified and a session was established between the workspace application 308 and the IDP 344. Therefore, the IDP 344 can grant access to the user to access the application server 340 (resources of the application). Since the IDP 344 authorized the user by using cookies or other information from at least one of the webviews 320 (or authentication webview), the IDP 344 may not transmit instructions to the workspace to launch a login page, thereby facilitating and improving SSO experience.

In some implementations, the URL processor 316 can obtain a cookie and a one-time URL for accessing the application from the IDP 344. For example, after establishing an authentication session with the IDP 344, the URL processor 316 can obtain a cookie from the IDP 344 for storage with the authentication initiator 312 or a webview used to authenticate the user. Subsequent to re-establishing the authentication session with the IDP 344 after intercepting an event to access the application, the URL processor 316 can obtain a one-time URL from the IDP 344, since the user is already authorized by the IDP 344 via the authentication session based on the cookie. For example, the IDP 344 can access the cookie to determine that the session was established between the workspace application 308 and either the IDP 344 or a different IDP. The URL processor 316 can invoke or process the one-time URL to redirect a webview 320 to launch or access the application server 340 for resources of the application.

In some embodiments, the remapped URL 328 may be configured to be used for establishing another session with a second IDP. The URL processor 316 can process the remapped URL 328, such that the authentication initiator 312 (or one of the webviews 320) can access the remapped URL 328. In some cases, the remapped URL 328 can be an IDP URL for accessing the second IDP. In this case, the authentication initiator 312 can initiate a session with a second IDP different from the IDP 344 used to authenticate the user to access the workspace. In some other cases, the URL processor 316 can process the remapped URL 328 configured to open a link to the application or the application server 340 for accessing the resources once the user is verified. For example, the URL processor 316 can use the remapped URL 328 to establish a session different from the authentication session with a second IDP.

Using this session, the authentication initiator 312 can connect to the second IDP. The second IDP can identify the cookies associated with the authentication initiator 312. If the cookie indicates that the client 304 was authenticated by the IDP 344, such as based on information from an existing authentication session, the second IDP can also authorize access to the client 304 to access the application server 340. Once authorized, the IDP 344 can provide a link to redirect the workspace application 308 to the respective application accordingly. The link to the application may be a part of the remapped URL 328, for example. In some cases, the cookies may not indicate an established authentication session with the IDP 344. In this case, the second IDP can transmit an instruction to the URL processor 316 to launch a login page in one of the webviews 320.

In some implementations, the workspace application 308 can copy the cookie for all webviews 320, e.g., from the authentication initiator 312 to other webviews 320. In this case, the second IDP can identify the cookie from any webview 320 used for establishing the current session for accessing the application server 340. Based on the cookie, the second IDP can grant authorization to the user if an authentication session was previously established between the client 304 and the IDP 344 (or other IDPs). Otherwise, the second IDP can instruct the URL processor to launch a login page in a webview 320 for the user to re-enter credentials. Once authenticated, the second IDP can provide a one-time URL or instruct the URL processor 316 to re-invoke or re-process the original URL 324 for the workspace application 308 to access the application server 340. The second IDP can perform features or functionalities similar to the IDP 344, such as establishing an authentication session with the workspace application 308. In some implementations, the second IDP can be a third-party IDP. In some other implementations, the IDP 344 discussed herein may or may not be a third-party IDP.

The third-party IDP can verify the identity of the client 304 based on the browsing context or cookies stored by the authentication initiator 312 or an authentication webview that previously established an authentication session with the IDP 344. Cookies can include or indicate browsing context (e.g., established session) or device information of the client 304. Based on the browsing context, the second IDP can provide the user with access to the application. Once provided with access, the workspace application 308 can launch the link (e.g., original URL 324 or one-time URL) to the application.

After completing the verification through the remapped URL 328 using the established authentication session, the workspace application 308 can be redirected to a link of or within the application server 340. The link can include or be a deep link to access a resource of the application server 340, bypassing the redirection by the application server 340 to the IDP 344. The IDP 344 can redirect the user of the client 304 to the link of the application server 340, thereby avoiding additional prompts for the credential to facilitate SSO and increase user's experience when accessing an application. The workspace application 308 can access the link of the application server 340 to be redirected or navigate to the requested resource of an application. Hence, using the workspace application 308, the user can provide one credential or a single set of credentials to access the workspace without having to re-authenticate when accessing one or more applications through the workspace.

By facilitating SSO by leveraging an existing session indicated by information associated with the embedded browser or webview (or establishing a new session using browsing context available to the IDP 344), the workspace application 308 can reduce network traffic between client 304 and the IDP 344 itself. For example, the workspace application 308 can reduce requests for credentials from IDP 344, the transmission of an additional webpage for users to log in, and the exchange of credential information from client 304. Further, the workspace application 308 can improve authorized user experience when accessing applications from IDP 344 managed by the administrator of the workspace or third-party IDP. For example, the user may not be prompted for credentials for one or more applications after successfully gaining access to the resources of the workspace service 336. Additionally, the workspace application 308 can reduce access time to one or more applications and improve the user verification process by not having to re-enter credentials or provide additional information.

Figure 4A:
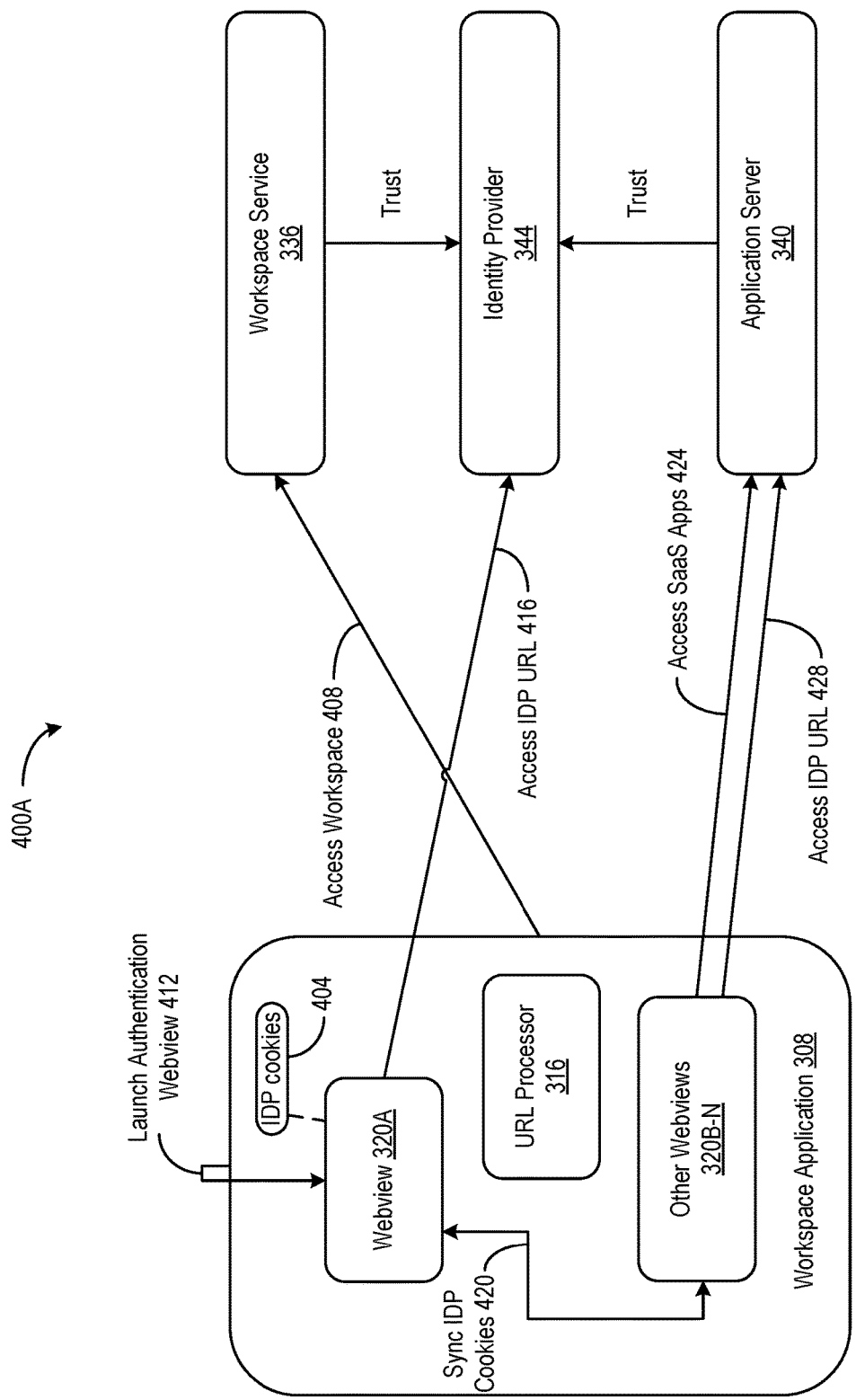
FIG. 4A is a block diagram of a method for copying IDP cookies, in accordance with an illustrative embodiment.

Referring to FIG. 4A, a block diagram of a method 400A for copying IDP cookies 404 is shown. The example method 400A of the block diagram can be executed, performed, or otherwise carried out by one or more components of the system 300 (e.g., client 304, network 332, workspace service 336, application server 340, IDP 344, or database 352), the computer 100, one or more components of the system 200, or any other computing devices described herein in conjunction with FIGS. 1A-2C. The method 400A can be performed in conjunction with FIG. 3 or include features or functionalities as described in FIG. 3, for example. In some cases, the method 400A can include or further describe one or more steps as in FIG. 3, for example. The block diagrams of method 400A can include one or more components including, but not limited to, workspace application 308, workspace service 336, application server 340 (sometimes referred to as application server 340), and IDP 344. The workspace application 308 can execute on the client 304. Each component (e.g., workspace application 308, workspace service 336, application server 340, and IDP 344) of the block diagrams can establish a communication channel, transmit, or receive data to or from other components via the network 332 (not shown in FIG. 4A). The IDP 344 can be a third-part IDP trusted by the workspace service 336 and the application server 340. For example, an entity managing the workspace service 336 can be different from an entity of the IDP 344.

The steps or processes discussed herein can facilitate SSO configuration by utilizing the IDP cookies 404 stored by the webview 320A. The webview 320A may be used for authenticating the user when accessing the workspace service 336. In further detail, the workspace application 308 executing on the client 304 can transmit a request to access the workspace service 336 (ACT 408). To gain access or verify the identity of the user, the workspace service 336 can redirect the workspace application 308 to an IDP 344 trusted by the workspace service 336. For example, the workspace service 336 can return or transmit an IDP URL to the workspace application 308 responsive to receiving the access request. The URL processor 316 (sometimes herein referred to as native logic) can process IDP URL or other instructions for the workspace application 308 to perform one or more features or functionalities discussed herein.

The workspace application 308 can launch the webview 320A (ACT 412). The webview 320A can be launched before, concurrent to, or after identifying or receiving the IDP URL. For instance, the webview 320 can be launched before or during communication with the workspace service 336. In some cases, the workspace application 308 can launch a different webview 320 used for authenticating the user. Upon launching the webview 320A, the webview 320A can access the IDP URL (ACT 416). For example, the URL processor 316 can instruct the webview 320A to access the IDP URL. The webview 320A can establish a communication channel or an IDP session with the IDP 344 responsive to accessing the IDP URL.

With the established IDP session, the webview 320A can transmit credentials entered or inputted by the user to the IDP 344. The IDP 344 can determine whether the credentials are valid. If the credentials are valid, the IDP 344 can allow or permit the workspace application 308 to access the workspace service 336. Information associated with the IDP session, such as credentials, an indication of authorization, etc., can be stored in the IDP cookies 404 in association with the webview 320A after the webview 320A is authenticated to access the workspace service 336. The workspace application 308 can sync or copy the IDP cookies 404 with or to one or more webviews 320 (ACT 420).

By syncing the IDP cookies 404 with other webviews 320, the webviews can include at least information similar to the IDP cookies 404 of the webview 320A. The workspace application 308 can sync the IDP cookies 404 of the webview 320A to other webviews 320 prior to requesting access to the application server 340 (sometimes referred to as a SaaS application), web applications, or accessing the URL link, for example. The application server 340 can manage data or other components of one or more applications. The application server 340 can be referred to generally as an application, SaaS application, web application, or application management server, for example. In some implementations, syncing the IDP cookies 404 can refer to syncing between cookies of an embedded browser used to access the workspace service 336 and cookies of any other webviews 320.

The workspace application 308 can transmit a request to access the application server 340 (ACT 424). The access request can be initiated by the user interacting with the SaaS application icon or link displayed on the client 304. One of the webviews 320 can be used for accessing the application server 340. Responsive to receiving the access request, the application server 340 can redirect (or attempt to redirect) the respective webview 320 communicating with the application server 340 to the IDP 344. For example, the webview 320 can receive, obtain, or identify an IDP URL for communicating with the IDP 344 for verification. The IDP 344 trusted by the application server 340 can be the same IDP 344 as the one trusted by the workspace service 336.

By redirecting the workspace application 308, the webview 320 can access the IDP URL for gaining access to the application server 340 (ACT 428). Responsive to redirecting the webview 320 to the IDP 344, the IDP 344 can identify cookies of the respective webview 320 used to access the application server 340. In this case, the user may not need to re-enter credentials or re-authenticate, since the cookies are available to the IDP 344. For example, the IDP 344 can identify the cookies of the webview 320. Since the IDP cookies 404 of the webview 320A are synced to one or more other webviews 320, the IDP 344 can determine that the respective webview 320 includes the information within the cookies similar to the IDP cookies 404, such as an indication that the user has been authenticated, valid credentials, or IDP session information. Hence, with the previous IDP session information, among other information indicating that the user is authorized to access the SaaS application, the IDP 344 can determine that the user has already been authenticated. Accordingly, the IDP 344 can provide the webview 320 with access to the application server 340 without re-prompting or requested additional credentials from the user. Indeed, the workspace application 308 can facilitate SSO by syncing IDP cookies 420 across various webviews 320, including the webview 320A.

In some implementations, the workspace application 308 can provide users with a seamless SSO experience for accessing the application server 340. For example, the process for verifying the user can be performed by the IDP 344 without prompting the user for credentials. Thus, for example, when the user interacts with a link or an icon associated with the application server 340, the user may not be shown a webview for authentication (e.g., the webview 320A or another webview 320 configured for authentication). Instead, the user can be presented with the application with resources from the application server 340 shortly after requesting access without other prompts or user interface in between. For instance, the user can be presented with the application responsive to transmitting the access request without being prompted for credentials.

Figure 4B:
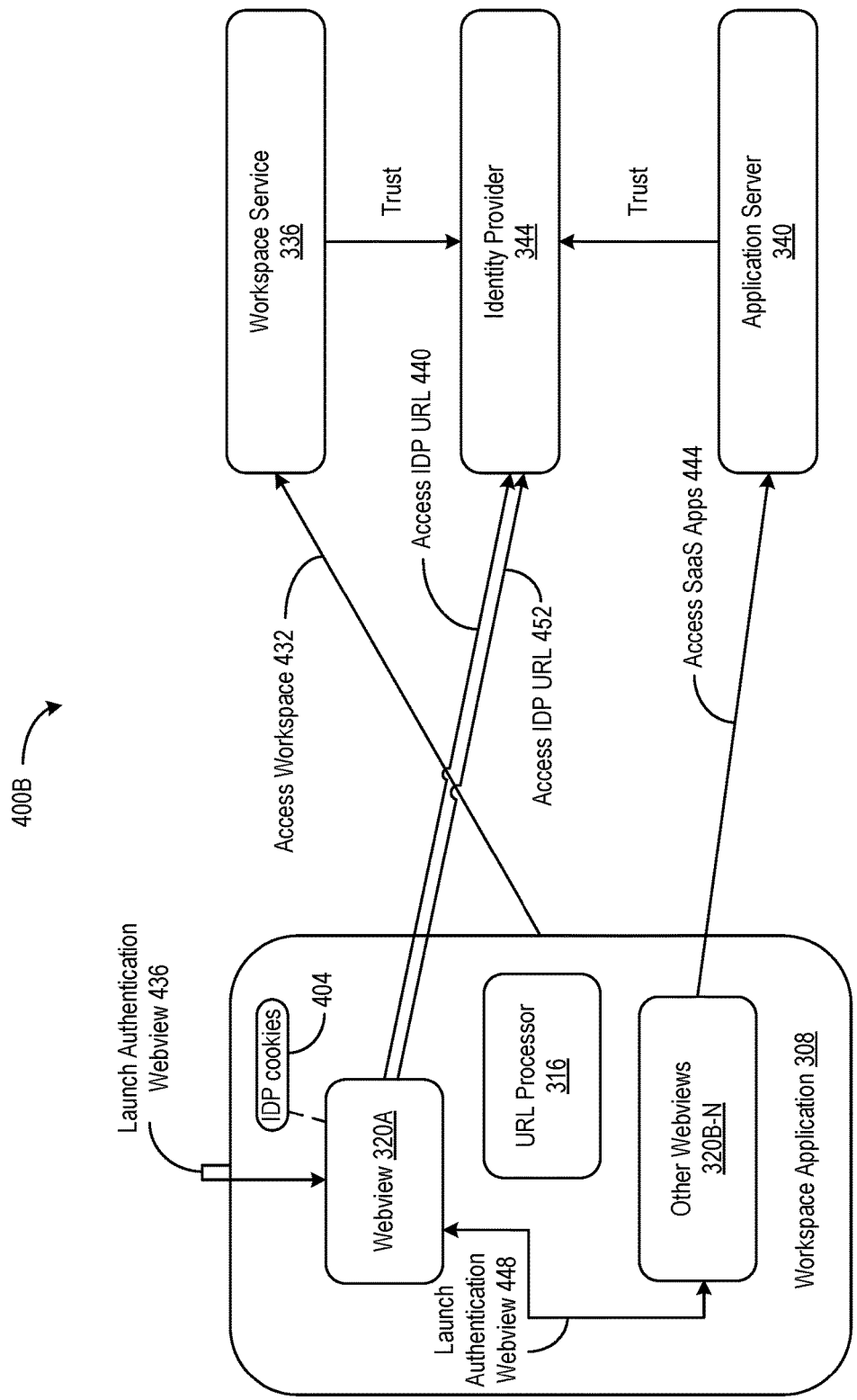
FIG. 4B is a block diagram of a method for using a webview for authentication URLs, in accordance with an illustrative embodiment.

Referring now to FIG. 4B in further detail, depicted is a block diagram of a method 400B for using a webview for authentication URLs, in accordance with an illustrative embodiment. The example method 400B of the block diagram can be executed, performed, or otherwise carried out by one or more components of the system 300 (e.g., client 304, network 332, workspace service 336, application server 340, IDP 344, or database 352), the computer 100, one or more components of the system 200, or any other computing devices described herein in conjunction with FIGS. 1A-2C. The method 400B can be performed in conjunction with or similar to features or functionalities described in FIG. 3, for example. In some cases, the method 400B can include or further describe one or more steps as in FIG. 3, for example. The block diagrams of method 400B can include one or more components including, but not limited to, workspace application 308, workspace service 336, application server 340 (sometimes referred to as application server 340), and IDP 344. The workspace application 308 can execute on the client 304. Each component (e.g., workspace application 308, workspace service 336, application server 340, and IDP 344) of the block diagrams can establish a communication channel, transmit, or receive data to or from other components via the network 332 (not shown in FIG. 4B).

The steps or processes discussed herein can facilitate SSO configuration by utilizing the IDP cookies 404 stored by the webview 320A (or a webview 320 used for authenticating the user when accessing the workspace service 336). The webview 320A can be a specific webview used for accessing an IDP URL in this case. The webview 320A can be a part of the webview 320, for authenticating the user and allowing the user to gain access to at least one of the workspace services 336 or the application server 340. The IDP URL, and other URLs, can be processed by the URL processor 316. At least one of the features or functionalities of method 400B can be similar to one or more steps or acts of method 400A.

The workspace application 308 can access or request access to the workspace service 336 (ACT 432). To access the workspace service 336, the workspace service 336 can transmit an IDP URL to the workspace application 308, used to establish a communication session with the IDP 344 for authenticating the user. The workspace application 308 can launch the webview 320A (ACT 436). The webview 320A can be launched, for example, responsive to receiving the IDP URL from the workspace service 336, processing the IDP URL via the URL processor 316, or receiving instructions from the URL processor 316 to launch the webview 320A for communication with the IDP 344. The webview 320A can be redirected by the workspace service 336 to the IDP 344 via accessing the IDP URL 440 (ACT 440). The IDP 344 can prompt the user to provide credentials. Upon successful authentication, the workspace application 308 can gain access to the workspace service 336. The user can request access to an application server 340, such as by interacting with an icon or link associated with the application server 340. The workspace application 308 can use one of the webviews 320 to open or access the application server 340 (or web application) URL in an embedded browser (ACT 444), for example. In some cases, ACT 432, ACT 436, ACT 440, and ACT 444 can include features or functionalities similar to ACT 408, ACT 412, ACT 416, and ACT 424, respectively, as an example.

In this case, with the application server 340 (or web application) opened in an embedded browser, the workspace application 308 can inform the embedded browser of all IDP domains for authenticating the user. The URL processor 316 can render, responsive to receiving a URL (e.g., the IDP URL) from the application server 340, the URL in the embedded browser. As part of the authentication process, the URL processor 316 can process the URL to identify an IDP URL for authenticating the user. The embedded browser can be redirected to the IDP URL as part of the authentication process for accessing the application server 340 or web application. The embedded browser can be a part of the workspace application 308 configured to use one or more webviews 320 including the webview 320A. The features or functionalities performed by the embedded browser can be generally described as the workspace application 308 performing the aforementioned features or functionalities.

The embedded browser can detect the IDP URL for redirecting to the IDP 344. The embedded browser can use the authentication webview 448 for rendering the IDP URL. For example, responsive to the URL processor 316 processing the URL to identify the IDP URL, the workspace application 308 can launch the webview 320A (ACT 448). In some implementations, if a different webview 320 is used to establish an IDP session with the IDP 344 for authenticating the user to access the workspace service 336, the workspace application 308 can launch the respective webview 320. The URL for accessing or opening the application server 340 can be, or be similar to, the original URL 324. The IDP URL configured to redirect the workspace application 308 responsive to accessing the application server 340, such as in ACT 444, can be, or be similar to, the remapped URL 328.

Responsive to detecting the IDP URL (or receiving a one-time URL from the IDP 344) based on the URL for accessing the application server 340, the webview 320A can access the IDP URL to communicate with the IDP 344 (ACT 452). The webview 320A can provide or make available the full IDP context to the IDP 344. The full IDP context can include at least the IDP cookies 404, local storage, indexed database, and saved passwords, among other information. The webview 320A can make the full IDP context available to the IDP 344 for determining the identity of the user and whether to prompt for authentication. The full IDP context can be available across the workspace application 308 or one or more applications included, installed, or provided as part of the workspace service 336. In some cases, the full IDP context may be available for applications (e.g., web applications or SaaS applications 340) trusting the same IDP 344 as trusted by the workspace service 336 for verifying the identity of the user. The IDP URL can be a part of an SSO configuration. For example, the URL processor 316 can process the URL for accessing the application server 340. Based on the URL, the URL processor 316 can determine a corresponding IDP URL for facilitating SSO by having the webview 320A re-access the IDP 344 for authenticating the user to access the application server 340. For instance, the webview 320A can proceed to the IDP 344 similar to when verifying the user for accessing the workspace service 336.

The IDP 344 can be in communication with the webview 320A responsive to the webview 320A accessing the IDP URL. The IDP 344 can access the IDP context or the full IDP context including IDP cookies 404, storage of the client 304, among other information permitted by the user for facilitating SSO. Since the user has previously been authenticated, such as when the workspace application 308 was verified to access the workspace service 336, the IDP 344 may not request additional credentials or inputs from the user. In this case, the user may not need to provide additional credentials or information to the IDP 344. The workspace application 308 may not be prompted with a login page, notification, or interface. Responsive to verifying the user based on the IDP context, the IDP 344 can notify the workspace application 308 of the successful verification. The workspace application 308 can redirect back to the URL for accessing the application server 340. For example, the URL processor 316 of the workspace application 308 can receive instructions from the IDP 344 upon successful authentication (e.g., using the IDP context) to redirect back to the original URL 324 for accessing the application server 340. In some cases, the URL processor 316 can identify or determine the corresponding original URL 324 for opening an application used to obtain the IDP URL.

For example, the URL processor 316 can perform a lookup in an SSO configuration to identify either the original URL 324 or the IDP URL (e.g., remapped URL 328) to render in the embedded browser of the workspace application 308. Accordingly, the workspace application 308 can redirect the embedded browser using one of the webviews 320 to the application server 340 upon verifying the user identity via SSO. The workspace application 308 can render the URL back in the embedded browser context (e.g., the web browser used for accessing the application server 340). Thus, the workspace application 308 can perform and facilitate SSO for the user when accessing one or more applications, such as applications available through the workspace service 336, by using the webview 320A having the full IDP context for verifying the user identity when accessing both the workspace service 336 and at least one of the applications.

Figure 5:
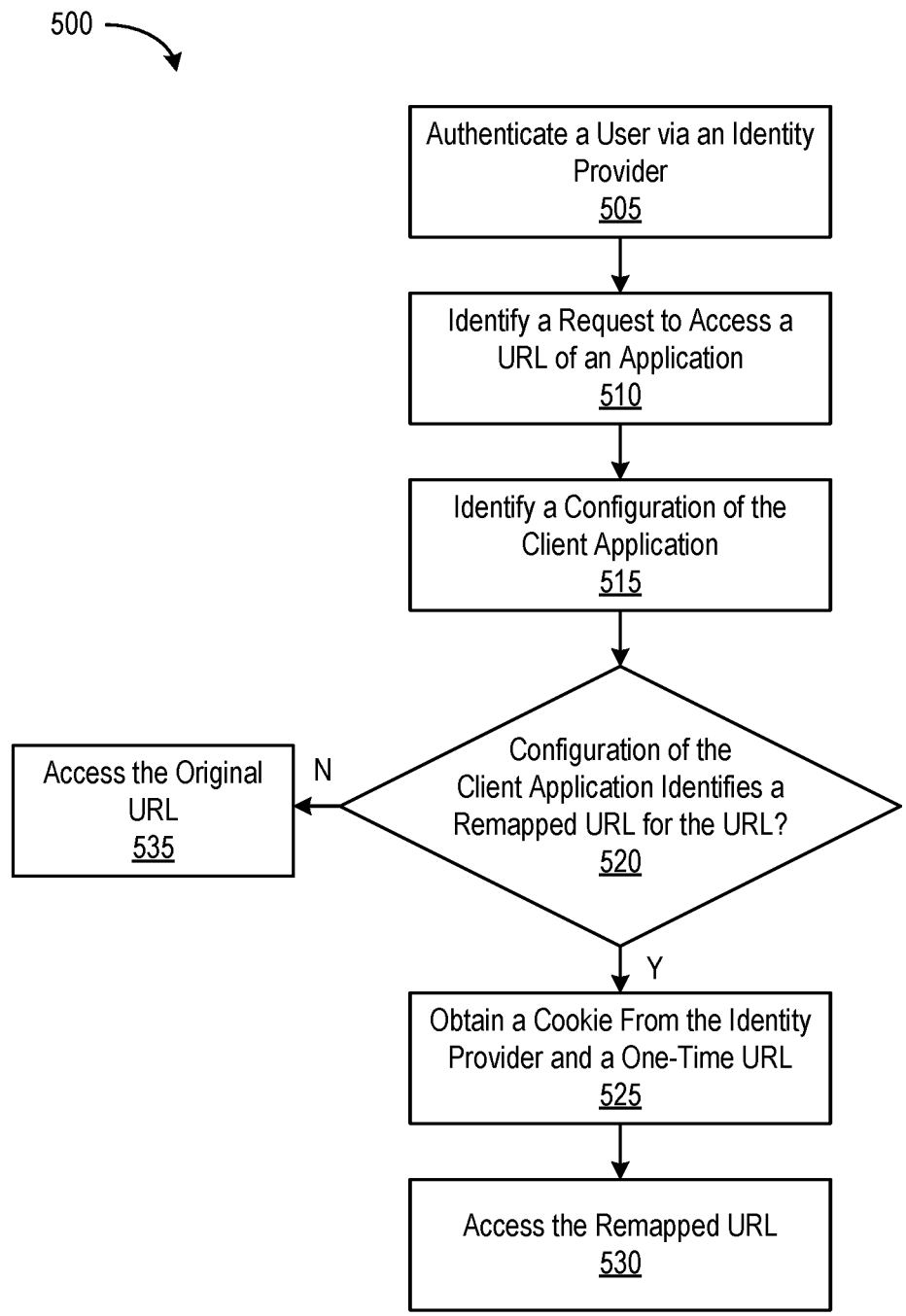
FIG. 5 is a flow diagram of a method for remapping uniform resource locator (URL) to authenticate users for applications via sessions with identity providers, in accordance with an illustrative embodiment.

Referring now to FIG. 5, depicted is a flow diagram of a method 500 for remapping a uniform resource locator (URL) to authenticate users for applications via sessions with identity providers. The method 500 can be executed, performed, or otherwise carried out by one or more components of the system 300 (e.g., the client 304, the network 332, the workspace service 336, the application server 340, the IDP 344, and the database 352), the computer 100, one or more components of the system 200, or any other computing devices described herein in conjunction with FIGS. 1A-2C. A client application can authenticate a user via an IDP to establish an authentication session (505). The client application can identify a request to access a uniform resource locator ("URL") of an application (510). The client application can identify a configuration of the client application (515). The client application can determine whether the configuration of the client application that identifies a remapped URL for the URL is available (520). The client application can obtain at least a cookie from the IDP and a one-time URL (525). The client application can access the remapped URL (530) instead of the URL. The client application can access the original URL (535).

In further detail, the client application (e.g., workspace application 308) can authenticate a user via an IDP to establish an authentication session (505). The authentication session can include a single sign-on ("SSO") session. For example, the authentication session can be used when validating the user identity for accessing one or more applications within the workspace. In some cases, the authentication session can be referred to as an IDP session. The client application can authenticate the user via the IDP trusted by the workspace (e.g., workspace service 336). The client application can transmit user credentials to the IDP via a communication channel established with the IDP. The authentication session can be established after the IDP approved or verified the user credentials. For instance, the IDP can approve of the user credentials by comparing or matching the provided credentials to a list of valid credentials stored in the database of the IDP. The client application (and the IDP) can maintain the authentication session (or the SSO session) established between the client application and the IDP. In some cases, the IDP may drop or terminate the authentication session responsive to a time-out, service update, or terminated connection from the workspace service, among others. The time-out can occur when the user is inactive for a predetermined duration, such as 20 minutes, 40 minutes, or 1 hour, configurable by the administrator of the workspace. The authentication session can include an IDP context including at least a cookie, credentials, storage, or an indexed database, among other information accessible to the IDP for authenticating the user. The client application can open a URL (e.g., IDP URL) in the same or similar context as the IDP context, where the authentication session is available for authenticating the user.

The client application can identify a request to access a URL of an application (510). The application can be hosted on the application server 340. The client application can identify the request responsive to intercepting an event (e.g., new window event handlers). For example, the client application can receive an indication of user interaction with a link or an icon requesting access to an application. The client application can intercept the access request. The client application can identify the URL of the application. Based on the identified URL, the client application can refer to a configuration of the client application, as in step (515).

The client application can identify a configuration of the client application (515). For example, the client application can perform a lookup in the configuration to determine whether the client application should invoke a remapped URL, such as the remapped URL 328 or a remapped IDP URL, instead of the original URL. The client application can identify the configuration governing the URLs responsive to intercepting an event, such as an event to access the application requested by the user. The configuration (e.g., configuration data or file) can be stored in a data storage or repository, retrievable by the client application. In some cases, the configuration can be included in the workspace (e.g., workspace service 336) accessible by the client application upon verification of the user identity. The configuration can include a table or a list of URLs with corresponding remapped URLs for access by the client application. The configuration can be configured by the administrator of the workspace. For example, the administrator can include URLs for redirecting to respective remapped URLs.

The client application can determine whether the configuration of the client application that identifies a remapped URL for the URL is available (520). The client application can invoke a function of the URL processor (e.g., native logic or URL processor 316) when receiving a URL with a domain indicated by the administrator. Based on receiving a URL with certain domains, the client application can scan the configuration for the respective domain. For example, the client application can determine whether the configuration includes the URL requested for access. If the URL corresponds to a remapped URL, the client application can proceed to step (525). Otherwise, if no remapped URL is configured or corresponds to the URL, the client application can proceed to step (535). The client application can invoke or access the remapped URL to authenticate the user for the application via the authentication session of the IDP. The authentication session can be available or established for accessing the workspace service. The remapped URL can be configured such that the IDP can redirect the client application to a link of the application responsive to verifying the user. The link of the application can be a deep link within the application.

The client application can obtain at least a cookie from the IDP and a one-time URL (525). For example, the client application can obtain a cookie from the IDP responsive to identifying a remapped URL for the URL. The remapped URL can be a one-time URL for communication with the IDP. The client application can access the one-time URL, such as the remapped URL, instead of the URL as in step (530), responsive to receiving or obtaining the one-time URL. The cookies from the IDP can include information on the communication session established with the IDP. In some implementations, the client application can obtain the one-time URL from the configuration (or SSO configuration) based on the domain of the intercepted URL.

The client application can access the remapped URL (530). The client application can access the remapped URL instead of the URL. By accessing the remapped URL, the client application can cause the user to use the authentication session of the IDP. Further, the remapped URL can cause the client application to be redirected from the IDP to the link of the application hosted or executing on the application server 340 upon authorization. For example, the remapped URL can include an indication of the application the user requested access to. The IDP can identify the indication of the application, such that, responsive to approving access, the IDP can provide a deep link within the application to the client application to avoid prompting the user with a request for credentials.

The remapped URL can be mapped to an SSO configuration via the IDP for the application. For example, if the SSO configuration is found for the original URL, the URL processor of the client application can return a remapped URL. The SSO configuration can instruct the client application to perform SSO to the IDP. The SSO configuration can include a deep link for redirecting the client application to the requested application. For example, the client application can be redirected to a deep link within the requested application based on the SSO configuration responsive to authorization by the IDP of the application.

The remapped URL can be a one-time URL obtained from the IDP. The IDP can provide support for issuing the one-time URL to the client application. The client application can invoke the one-time URL for rendering in an embedded browser of the client application to replicate the IDP session or authentication session (e.g., cookies, etc.) used to verify access to the workspace. By replicating the authentication session, the IDP can access other IDP contexts of the established authentication session, for example. The client application can invoke the one-time URL in a different webview, such as a webview different from the authentication webview. The webview can communicate with the IDP to provide one or more IDP contexts. Since the authentication session has previously been established, the IDP can grant the user access to the application without requesting additional credentials per the SSO configuration.

In some implementations, the client application can intercept an event (e.g., new window event handlers), such as a request to access the application. The client application can cause a new window to access the application responsive to intercepting the event. For example, the new window can be different from the window used to interact with the icon or URL for launching the application. The new window can be a webview of an embedded browser. The client application can identify the URL to be accessed or opened for the new window with the intercepted event. The client application can identify the method of the URL. For example, the method may be part of a Hypertext Transfer Protocol (HTTP) method, such as GET, POST, PUT, HEAD, and DELETE, among others. The new window can be executed in the background of the client application for SSO. The client application may not launch, open, or access the requested application if the event is intercepted, for example. Therefore, if the client application successfully authenticates the user using a remapped URL, the client application can access the application without prompting or displaying a window requesting credentials from the user. In this manner, the client application can provide a seamless SSO experience for the user by launching the application without being prompted for additional credentials.

In some implementations, the remapped URL can be configured to establish another session with a second IDP. For example, the client application can access the remapped URL directed to a second IDP different from the first IDP used to authorize access to the workspace service. The second IDP can be trusted by the application server. The second IDP may or may not be trusted by the workspace service. By accessing the second IDP, the client application can provide the cookie or IDP context from the established authentication session with the first IDP to the second IDP. Accordingly, the second IDP can perform features or functionalities similar to the first IDP which can grant access to the application upon verifying that the authentication session has been established. In this case, the client application can establish a second authentication session with the second IDP. A similar process can be performed when accessing other IDPs (e.g., a third IDP, a fourth IDP, etc.), such that the client application can perform SSO to access other applications. When authorized, the client application can open a link to the application requested by the user. The link can be a deep link within the application, different from the original URL. In some implementations, the link can be the original URL, with the IDP notifying the application server of the authorization.

In some implementations, the client application can access the application without accessing the remapped URL. By accessing the application, the application can redirect the client application to the IDP. For example, the client application can transmit the access request to the application. The application can transmit, responsive to receiving an access request, an IDP URL for the client application to invoke for establishing a communication channel with the IDP. The client application can invoke the IDP URL by rendering the IDP URL within an embedded browser using a webview, such as an authentication webview. The webview used by the client application can include at least a cookie or IDP context having information of the authentication session established between the client application and the IDP to access the workspace. Hence, the cookie or the IDP context can be available to the IDP for verifying the user identity.

In some implementations, the client application can use a webview of an embedded browser of the client application to access the remapped URL. For example, the client application can sync or copy the cookie from an authentication webview used to establish the authentication session with other webviews. Hence, when any webview accesses the remapped URL or the URL IDP, the IDP can obtain at least some information from the IDP context. The client application can be redirected to a link to access the application responsive to accessing the remapped URL.

In some implementations, the client application can use an authentication webview (e.g., authentication initiator 312 or webview 320A) to access the remapped URL. The authentication webview can be the same webview used to access the IDP URL for verifying access to the workspace where the application is being accessed from. The client application can access the remapped URL identified in the SSO configuration obtained from the administrator. The client application can obtain the SSO configuration from the workspace service or the local storage of the client application. For example, responsive to the client application identifying or determining the remapped URL, the client application can render the remapped URL in an embedded browser using the authentication webview. Hence, the client application can communicate with the IDP, such as in the established authentication session.

By using the remapped URL and the established authentication session, the client application can access the application without being prompted for credentials. Accordingly, the client application can provide a user with SSO for accessing one or more applications via the workspace service. Thus, the client application can at least facilitate SSO using the remapped URL, reduce traffic, improve access time to applications, and decrease resource consumption from duplicate or additional credentials transmitted from the user. For instance, the client application can reduce traffic by not needing the client to transmit additional credentials when accessing one or more applications of the SSO configuration.

In some implementations, the client application can obtain a cookie from the IDP responsive to gaining access to the requested application. For example, the client application can store the cookie from the IDP indicating that the user is verified to access the application. The client application can provide the IDP or other IDPs access to the cookies when requesting access to other applications. The client application can obtain a one-time URL from the IDP in response to being verified. In this case, the one-time URL can refer to a deep link for accessing the application. The client application can use the one-time URL to access the application and bypass being redirected from the application server to the IDP, for example.

In some cases, the client application can access the original URL (535). The client application can access the original URL responsive to determining that the configuration of the client application does not identify a remapped URL for the URL. For example, the client application may not identify the original URL within the SSO configuration or the configuration may not be preconfigured with a corresponding remapped URL by the administrator.

Accordingly, the client application can access the original URL (e.g., the URL intercepted by the client application) to access the requested application. In this case, the application server can redirect the client application to a trusted IDP for verification. Further, the client application may receive a prompt for the user to provide credentials in this case.

FURTHER EXAMPLE EMBODIMENTS

The following examples pertain to further embodiments, from which numerous permutations and configurations will be apparent.

Example 1 includes a method including authenticating, by a client application, a user via an identity provider to establish an authentication session; identifying, by the client application, a request to access a uniform resource locator (URL) of an application hosted on a remote computing device; determining, by the client application, that a configuration of the client application identifies a remapped URL for the URL is available, the remapped URL configured to authenticate the user for the application via the authentication session of the identity provider and be redirected by the identity provider to a link of the application; and accessing, by the client application, the remapped URL instead of the URL to cause the user to use the authentication session of the identity provider and be redirected from the identity provider to the link of the application on the remote computing device.

Example 2 includes the subject matter of Example 1, wherein the authentication session comprises a single sign-on (SSO) session.

Example 3 includes the subject matter of any of Examples 1 and 2, further comprising maintaining, by the client application, the authentication session with the identity provider.

Example 4 includes the subject matter of any of Examples 1 through 3, further comprising obtaining, by the client application, a cookie from the identity provider and a one-time URL for accessing the application from the identity provider.

Example 5 includes the subject matter of any of Examples 1 through 4, further comprising intercepting, by the client application, an event to cause a new window to access the application and identifying the URL to be accessed for the new window.

Example 6 includes the subject matter of any of Examples 1 through 5, wherein the remapped URL is mapped to a single sign-on (SSO) configuration via the identity provider for the application.

Example 7 includes the subject matter of any of Examples 1 through 6, wherein the remapped URL is configured to establish another session with a second identity provider and open the link to the application.

Example 8 includes a client application on a client device in communication with an identity provider and an application on a remote computing device, the client application to authenticate a user via an identity provider to establish an authentication session; identify a request to access a uniform resource locator (URL) of the application hosted on the remote computing device; determine that a configuration of the client application identifies a remapped URL for the URL is available, the remapped URL configured to authenticate the user for the application via the authentication session of the identity provider and be redirected by the identity provider to a link of the application; and access the remapped URL instead of the URL to cause the user to use the authentication session of the identity provider and be redirected from the identity provider to the link of the application on the remote computing device.

Example 9 includes the subject matter of Example 8, wherein the authentication session comprises a single sign-on (SSO) session.

Example 10 includes the subject matter of any of Examples 8 and 9, wherein the client application is further configured to maintain the authentication session with the identity provider.

Example 11 includes the subject matter of any of Examples 8 through 10, wherein the client application is further configured to obtain a cookie from the identity provider and a one-time URL for accessing the application from the identity provider.

Example 12 includes the subject matter of any of Examples 8 through 11, wherein the client application is further configured to intercept an event to cause a new window to access the application and identifying the URL to be accessed for the new window.

Example 13 includes the subject matter of any of Examples 8 through 12, wherein the remapped URL is mapped to a single sign-on (SSO) configuration via the identity provider for the application.

Example 14 includes the subject matter of any of Examples 8 through 13, wherein the remapped URL is configured to establish another session with a second identity provider and open the link to the application.

Example 15 includes a non-transitory computer readable medium storing program instructions for causing one or more processors to authenticate a user via an identity provider to establish an authentication session; identify a request to access a uniform resource locator (URL) of an application hosted on a remote computing device; determine that a configuration of a client application identifies a remapped URL for the URL is available, the remapped URL configured to authenticate the user for the application via the authentication session of the identity provider and be redirected by the identity provider to a link of the application; and access the remapped URL instead of the URL to cause the user to use the authentication session of the identity provider and be redirected from the identity provider to the link of the application on the remote computing device.

Example 16 includes the subject matter of Example 15, wherein the authentication session comprises a single sign-on (SSO) session.

Example 17 includes the subject matter of any of Examples 15 through 16, wherein the program instructions further cause the one or more processors to maintain the authentication session with the identity provider.

Example 18 includes the subject matter of any of Examples 15 through 17, wherein the program instructions further cause the one or more processors to obtain a cookie from the identity provider and a one-time URL for accessing the application from the identity provider.

Example 19 includes the subject matter of any of Examples 15 through 18, wherein the program instructions further cause the one or more processors to intercept an event to cause a new window to access the application and identifying the URL to be accessed for the new window.

Example 20 includes the subject matter of any of Examples 15 through 19, wherein the remapped URL is mapped to a single sign-on (SSO) configuration via the identity provider for the application.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
storing, by a client application, a remapped uniform resource locator (URL) in memory local to a device hosting the client application;
authenticating, by the client application and subsequent to storing the remapped URL in the memory, a user via an identity provider to establish an authentication session;
identifying, by the client application, a request to access a URL of an application hosted on a remote computing device;
determining, by the client application, that a configuration of the client application that identifies the remapped URL for the URL is available, the remapped URL configured to cause authentication of the user for the application via the authentication session of the identity provider and to cause redirection of the client application by the identity provider to a link of the application; and
accessing, by the client application, the remapped URL instead of the URL to cause use of the authentication session of the identity provider and redirection from the identity provider to the link of the application on the remote computing device.

2. The method of claim 1, wherein the authentication session comprises a single sign-on (SSO) session.

3. The method of claim 1, further comprising maintaining, by the client application, the authentication session with the identity provider.

4. The method of claim 1, further comprising obtaining, by the client application, a cookie from the identity provider and a one-time URL for accessing the application from the identity provider.

5. The method of claim 1, further comprising intercepting, by the client application, an event to cause a new window to access the application and identifying the URL to be accessed for the new window.

6. The method of claim 1, wherein the remapped URL is mapped to a single sign-on (SSO) configuration via the identity provider for the application.

7. The method of claim 1, wherein the remapped URL is configured to establish another session with a second identity provider and open the link to the application.

8. A system comprising:
a client application on a client device in communication with an identity provider and an application on a remote computing device, the client application to:
store a remapped uniform resource locator (URL) in memory local to a device hosting the client application;
authenticate, subsequent to storage of the remapped URL in the memory, a user via an identity provider to establish an authentication session;
identify a request to access a URL of the application hosted on the remote computing device;
determine that a configuration of the client application that identifies the remapped URL for the URL is available, the remapped URL configured to cause authentication of the user for the application via the authentication session of the identity provider and to cause redirection of the client application by the identity provider to a link of the application; and
access the remapped URL instead of the URL to cause use of the authentication session of the identity provider and redirection from the identity provider to the link of the application on the remote computing device.

9. The system of claim 8, wherein the authentication session comprises a single sign-on (SSO) session.

10. The system of claim 8, wherein the client application is further configured to maintain the authentication session with the identity provider.

11. The system of claim 8, wherein the client application is further configured to obtain a cookie from the identity provider and a one-time URL for accessing the application from the identity provider.

12. The system of claim 8, wherein the client application is further configured to intercept an event to cause a new window to access the application and to identify the URL to be accessed for the new window.

13. The system of claim 8, wherein the remapped URL is mapped to a single sign-on (SSO) configuration via the identity provider for the application.

14. The system of claim 8, wherein the remapped URL is configured to establish another session with a second identity provider and open the link to the application.

15. A non-transitory computer readable medium storing program instructions for causing one or more processors to:
store a remapped uniform resource locator (URL) in memory local to a device incorporating the one or more processors;
authenticate, subsequent to storage of the remapped URL in the memory, a user via an identity provider to establish an authentication session;
identify a request to access a URL of an application hosted on a remote computing device;
determine that a configuration of a client application that identifies the remapped URL for the URL is available, the remapped URL configured to cause authentication of the user for the application via the authentication session of the identity provider and to cause redirection by the identity provider to a link of the application; and
access the remapped URL instead of the URL to cause use of the authentication session of the identity provider and redirection from the identity provider to the link of the application on the remote computing device.

16. The non-transitory computer readable medium of claim 15, wherein the authentication session comprises a single sign-on (SSO) session.

17. The non-transitory computer readable medium of claim 15, wherein the program instructions further cause the one or more processors to maintain the authentication session with the identity provider.

18. The non-transitory computer readable medium of claim 15, wherein the program instructions further cause the one or more processors to obtain a cookie from the identity provider and a one-time URL for accessing the application from the identity provider.

19. The non-transitory computer readable medium of claim 15, wherein the program instructions further cause the one or more processors to intercept an event to cause a new window to access the application and to identify the URL to be accessed for the new window.

20. The non-transitory computer readable medium of claim 15, wherein the remapped URL is mapped to a single sign-on (SSO) configuration via the identity provider for the application.

* * * * *